(12) United States Patent
Horniak et al.

(10) Patent No.: US 8,602,195 B2
(45) Date of Patent: Dec. 10, 2013

(54) BOTTLE RECEIVING AND DETECTION APPARATUS AND METHOD THEREFORE

(75) Inventors: John Colin Horniak, Warrington, PA (US); Audie F. Thomas, Norristown, PA (US)

(73) Assignee: Deltronic Labs, Inc., Chalfont, PA (US)

( * ) Notice: Subject to any disclaimer, the term of this patent is extended or adjusted under 35 U.S.C. 154(b) by 341 days.

(21) Appl. No.: 12/945,089

(22) Filed: Nov. 12, 2010

(65) Prior Publication Data

US 2011/0114440 A1     May 19, 2011

Related U.S. Application Data

(63) Continuation-in-part of application No. 12/348,259, filed on Jan. 2, 2009.

(60) Provisional application No. 61/260,459, filed on Nov. 12, 2009, provisional application No. 61/018,658, filed on Jan. 2, 2008, provisional application No. 61/075,355, filed on Jun. 25, 2008.

(51) Int. Cl.
*B65G 47/56* (2006.01)
*G07F 7/00* (2006.01)

(52) U.S. Cl.
USPC .................................. 193/31 R; 194/205

(58) Field of Classification Search
None
See application file for complete search history.

(56) References Cited

U.S. PATENT DOCUMENTS

| | | | |
|---|---|---|---|
| 3,310,157 | A | 3/1967 | Clark |
| 4,027,833 | A | 6/1977 | Bernard et al. |
| 5,082,099 | A | 1/1992 | Abe |
| 8,360,272 | B2 | 1/2013 | Piersant et al. |
| 8,448,772 | B2 | 5/2013 | Wind |
| 2007/0012541 | A1 | 1/2007 | Boydston et al. |
| 2008/0121492 | A1* | 5/2008 | Kreitz et al. ............. 194/205 |
| 2008/0308383 | A1* | 12/2008 | Boydston et al. ........ 194/205 |

* cited by examiner

*Primary Examiner* — Kavel Singh
(74) *Attorney, Agent, or Firm* — Fox Rothschild LLP

(57) ABSTRACT

An apparatus for receiving and detecting a bottle having a chute configured for receiving the bottle therein, a first sensor disposed to detect the bottle at a first position within the chute, a second sensor disposed to detect the bottle at a second position within the chute, and a third sensor disposed to detect the bottle at a third position within the chute, and an indicator in communication with the sensors to provide indication that a bottle was received. A method carried out by the apparatus is also provided.

22 Claims, 22 Drawing Sheets

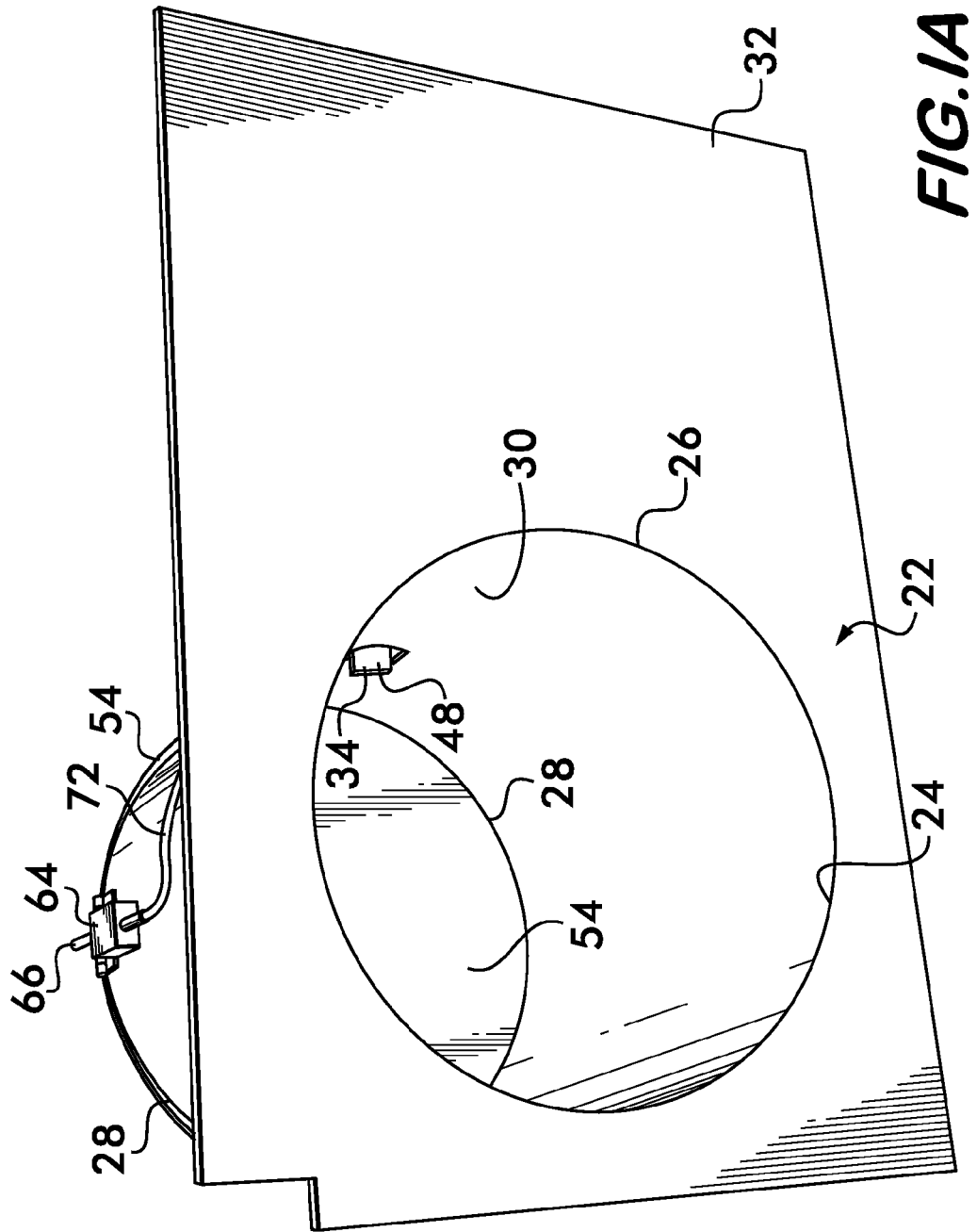

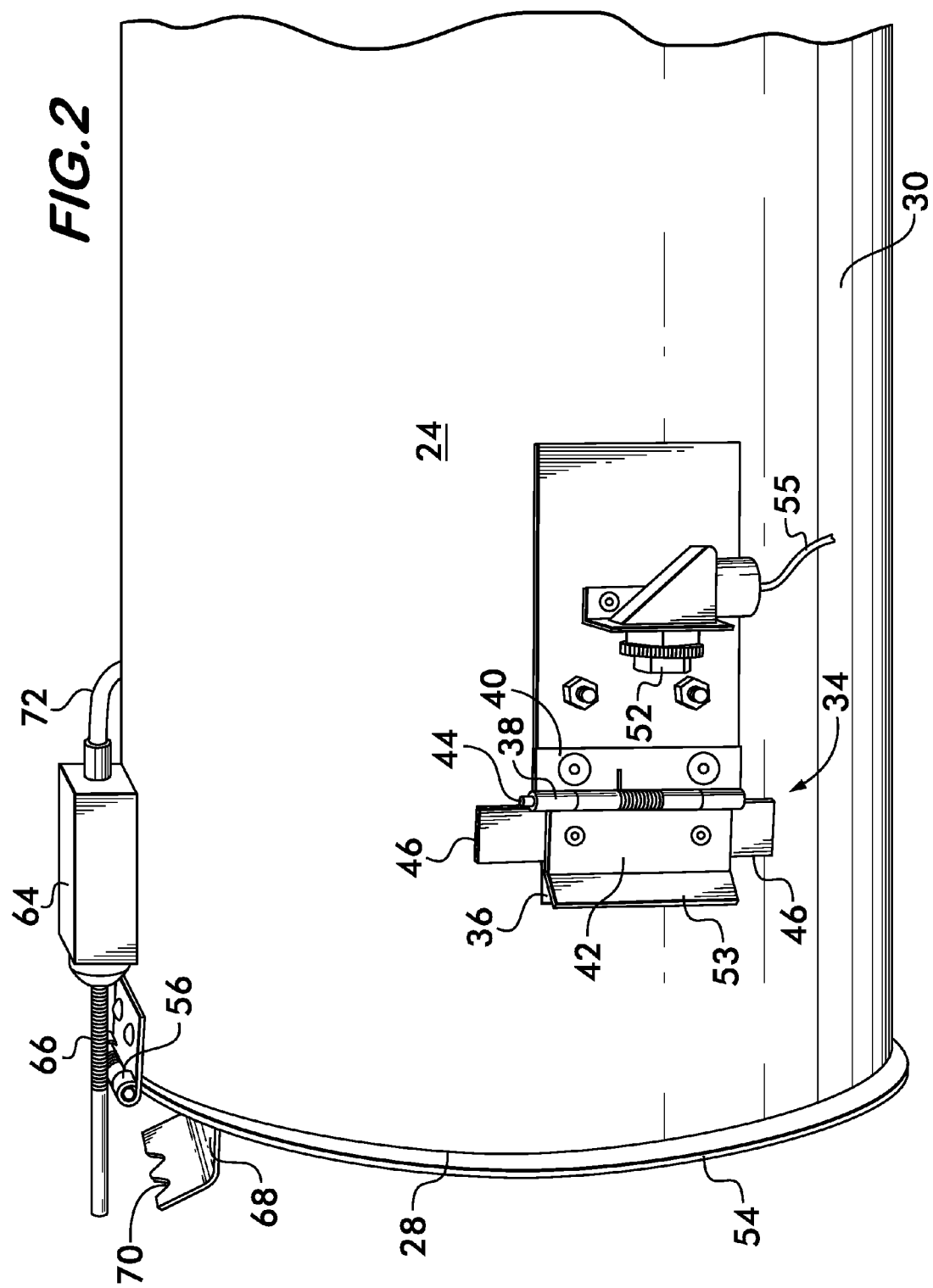

BOTTLE RECEIVING AND DETECTION APPARATUS AND METHOD THEREFORE

CROSS-REFERENCE TO RELATED APPLICATIONS

This application claims the benefit of U.S. Provisional Application No. 61/260,459, filed Nov. 12, 2009, and is a continuation-in-part of U.S. application 12/348,259, filed Jan. 2, 2009, which application claims the benefit of U.S. Provisional Application Nos. 61/018,658, filed Jan. 2, 2008 and 61/075,355, filed Jun. 25, 2008, all of which are hereby incorporated herein by reference in their entirety.

FIELD OF THE INVENTION

The present invention relates to bottle collection and recycling, and more particularly to devices for sensing and securely storing returned bottles and other similar items.

BACKGROUND OF THE INVENTION

It is known to recycle items such as glass and plastic bottles. This helps conserve resources and energy. While the return of empty bottles was previously mostly a manual process, more automated methods of receiving empty bottles have been developed.

One such device for receiving empty water bottles is disclosed in U.S. Patent Publication US2007/0012541 A1 which is incorporated herein by reference. The device and method disclosed in the publication provides for a bottle collection bin that receives and securely stores numerous empty bottles until such time as the bin is emptied. The bin includes a receiving chute through which the bottles are moved from the exterior into the interior of the bin where the bottles are stored. The bin can include means for detecting the intake of a bottle, such as a sensor, and means for indicating that a bottle was received, such as by dispensing a receipt (e.g. ticket), as proof that a bottle was returned. The receipt, for example, could be used to obtain a discount for the purchase of another full water bottle, or for the return of a deposit on the bottle.

In one known device, the means for sensing the return of the bottle is provided by an optical sensor placed near an outlet of the bottle receiving chute. The chute has an inlet through which the bottle is placed into the bin, and an outlet through which the bottle falls into the locked bin cage from where it can be removed only by an authorized person. As a bottle is pushed through the inlet of the bottle receiving chute towards the outlet, the bottle eventually exits from the outlet and falls into the cage, passing by the optical sensor that detects the bottle. Placement of the sensor near the outlet of the chute allows the sensor to detect bottles that have exited the chute and are falling into the cage. Since many such bins may be placed in areas that are not monitored, it is important to provide adequate security and sensing means so that only one receipt is dispensed for each empty bottle, regardless of attempts by users to fool the device into issuing additional receipts. Nevertheless, one concern with presently known systems is that users can tamper with the device by moving a bottle or other item through the chute and, rather then releasing the item, move the item back and forth across the sensor to obtain unauthorized tickets or receipts. Another major concern is the possibility of false sensor detections. For example, it has been found that lightning, birds flying near the sensor, or even objects blown by the wind past the sensors can trigger false detection signals. Accordingly, an improved bottle receiving device that can securely receive bottles and which is less prone to tampering and false signals would be advantageous.

SUMMARY OF THE INVENTION

The invention provides an improved bottle receiving device. In one form the invention provides an apparatus for receiving and detecting a bottle having a chute configured for receiving the bottle therein, the chute having an inlet for receiving the bottle and an outlet through which the bottle exits the chute. A first sensor is disposed to detect the bottle at a first position within the chute; a second sensor is disposed to detect the bottle at a second position within the chute, the second position being spaced longitudinally from the first position between the first position and the outlet; and a third sensor is disposed to detect the bottle at a third position within the chute, the third position being spaced longitudinally from the second position between the second position and the outlet. A receipt dispenser is in data communication with the first and second sensors for issuing a receipt based on the data received.

A method of receiving and detecting a bottle is provided. The method includes providing a chute having an inlet through which the bottle is received and an outlet through which the bottle exits, the chute extending longitudinally from the inlet to the outlet. Next method detects the bottle at various positions in the chute as follows:

(1) detecting the bottle at a first position within the chute via a sensor in communication with an indicator;

(2) upon satisfaction of (1), detecting the bottle at a second position within the chute via a sensor in communication with the indicator, the second position being spaced longitudinally from said first position between the first position and the outlet.

Upon completion of steps 1 and 2, the indicator causes a receipt to be dispensed.

In another form, the invention provides an apparatus for receiving and detecting a bottle which has a chute configured for receiving the bottle therein. The chute has a bottle inlet for receiving the bottle and a bottle outlet through which the bottle exits the chute. A first bottle stop has a moveable first stop member disposed within the chute and is biased towards the bottle to allow the stop member to engage the bottle moving through the chute. The stop member is configured such that the stop member is urged by the bottle in a direction away from the bottle as the bottle moves from the inlet to the outlet thereby allowing the bottle to pass, and the stop member is moved by the bottle in accordance with the bias in a direction towards the bottle as the bottle moves in a direction from the outlet to the inlet to more forcibly engage and thereby inhibit movement of the bottle. A second stop has a second stop member disposed to engage the bottle within the chute and inhibit movement of the bottle moving from the outlet to the inlet, the second stop member being disposed to engage the bottle along a different area of the bottle than the first stop member. An indicator is provided for indicating the receipt of a bottle. A first sensor is provided for detecting when the bottle is at a first position within the chute, the sensor being in communication with the indicator; and a second sensor for detecting when the bottle is at a second position within the chute spaced longitudinally from the first position between the first position and the outlet, the second sensor being in communication with the indicator.

The sensors communicate with the indicator which can include a controller, and which can be programmed as desired to carry out the desired logic sequence before a receipt is issued.

BRIEF DESCRIPTION OF THE DRAWINGS

The following detailed description will be better understood when read in conjunction with the figures appended hereto. For the purpose of illustrating the invention, there is shown in the drawings a preferred embodiment. It is understood, however, that this invention is not limited to this embodiment or the precise arrangements shown.

FIG. 1A is a front perspective view of a bottle return chute of a preferred embodiment of the present invention;

FIG. 2 is a side perspective view of the apparatus shown and oriented in FIG. 1A;

FIG. 8 shows an empty water bottle in the inlet opening;

FIG. 9 shows the empty water bottle moved sufficiently into the inlet opening to engage the first bottle stop;

FIG. 10 is top view similar to FIG. 9;

FIG. 11 is an enlarged view showing the empty water bottle which has moved sufficiently into the inlet opening to engage the first bottle stop, similar to FIG. 9;

FIG. 12 is a top view of the bottle return/collection chute assembly showing the bottle which has moved sufficiently to engage the second bottle stop;

FIG. 13 shows the empty water bottle which has moved towards the outlet opening to engage and move the flap and thereby operate the mechanical sensor;

FIG. 14 shows the empty bottle exiting the apparatus of FIG. 1A;

DETAILED DESCRIPTION

Figure 1:
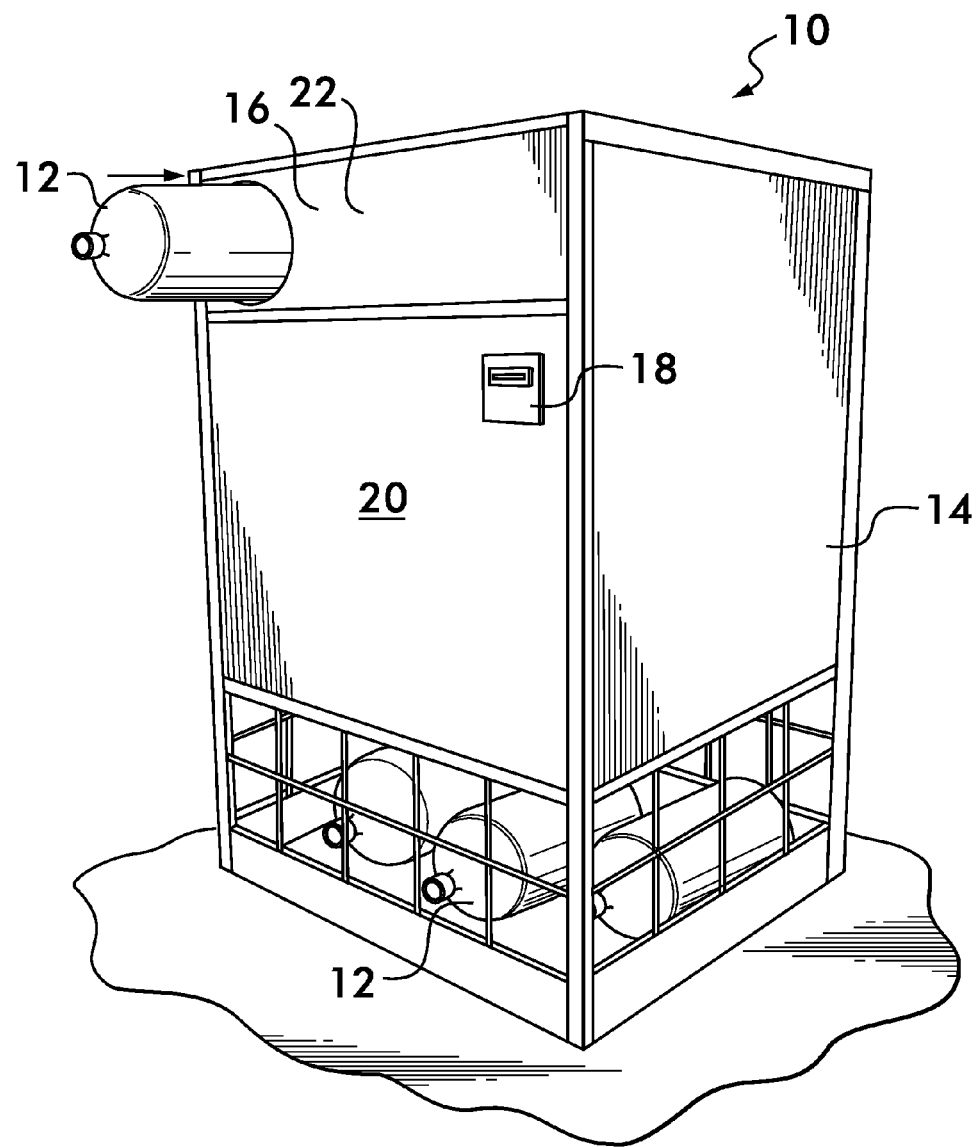
FIG. 1 is a perspective view of a bottle collection device in accordance with the present intention.

With reference to FIG. 1, a bottle collection device 10 can securely receive and hold returned bottles 12, such as plastic water bottles as shown. The device 10 preferably includes a bin or cage like structure 14 as shown which can be locked securely to prevent unauthorized removal of the bottles, and a bottle receiving apparatus 16 which receives and detects the bottles. In the illustrated embodiment, an indicator 18 provides evidence that a bottle was received. The indicator 18 can include devices that dispense receipts, e.g., tickets, as proof that a bottle was returned. Any type of bin or cage like structure which can securely hold the returned bottles can be used. The illustrated device 10 includes security bars and side panels as necessary to securely hold the bottles within. A lockable access panel 20 allows removal of the returned bottles and access to the interior as needed. The device 10 is preferably constructed of tamper resistant materials such as steel.

Figure 3:
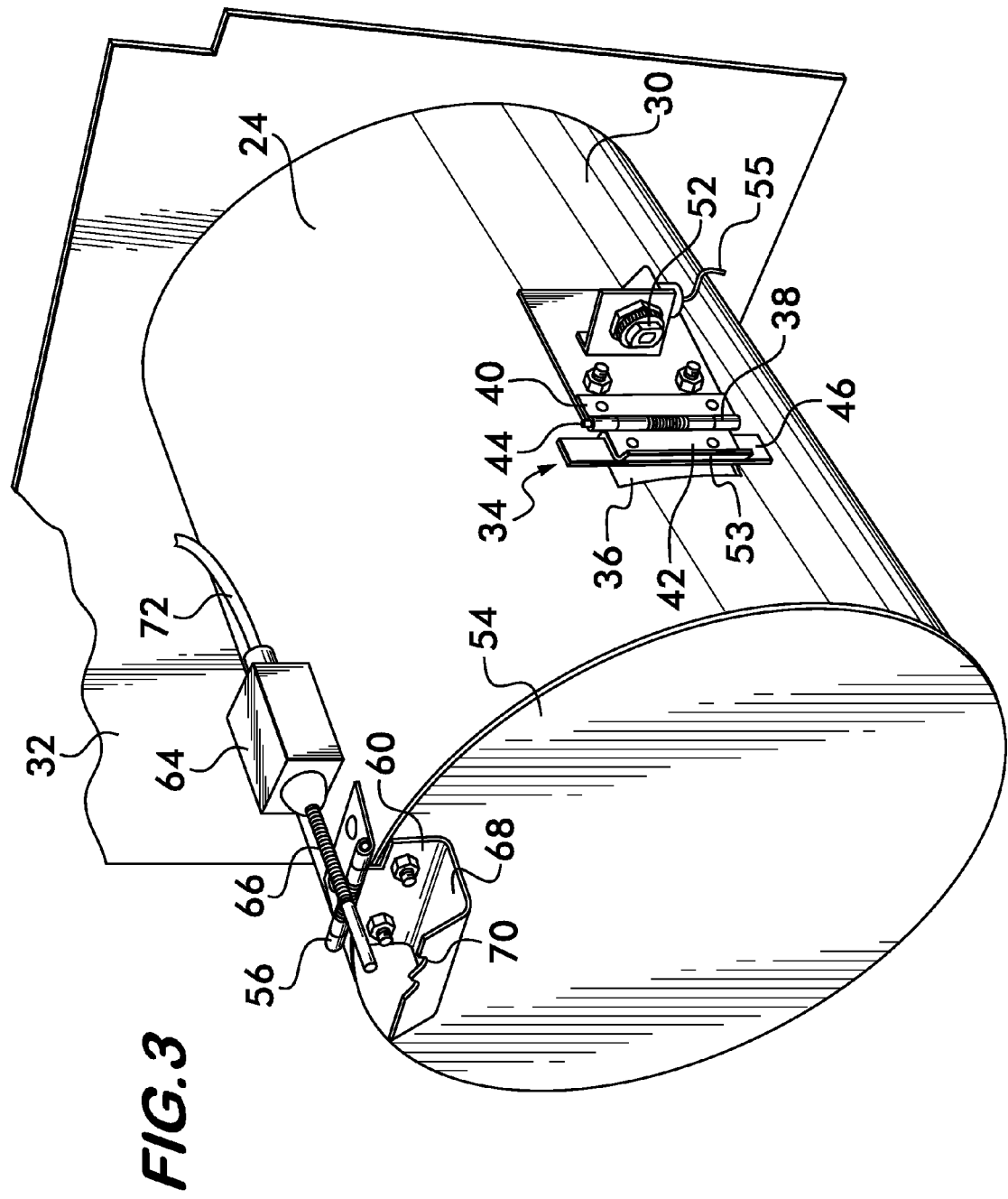
FIG. 3 is a rear side perspective view of the apparatus shown in FIG. 1A.

With reference to FIGS. 1A, 2 and 3, the illustrated bottle receiving apparatus 16 of the present invention is formed as a bottle return chute assembly 22 configured for use with 3 and 5 gallon plastic water bottles. The bottle return chute assembly 22 is shown removed from a top section of the collection device 10, it being understood that the return chute assembly 22 can be fabricated separately from the remainder of the collection device 10 and attached in a suitable manner such as by welding or with fasteners such as bolts, rivets, etc. The bottle collection apparatus 10 receives the water bottles through the chute assembly 22, i.e., this apparatus allows a user to insert a water bottle through the chute assembly into the return apparatus 10.

The chute assembly 22 has as a cylindrical chute 24 which has a circular inlet opening 26, a circular outlet opening 28, and a cylindrical chute wall 30 extending between the inlet and outlet openings. With reference to FIG. 1, the bottle 12 is shown entering the inlet 26 while the outlet 28, not shown, is within the bin 14 so that the bottles can fall securely into the bin. It is appreciated that the chute 24 is sized and configured for the particular objects to be received therein. Nevertheless, it is contemplated that non cylindrical and non fully enclosed chutes may also be used, even for cylindrical bottles. A front flat panel 32 is connected to the inlet side of the chute 24. In the present case, the chute is sized and configured to receive 3 and 5 gallon cylindrical plastic water bottles as known in the art. An example of a 5 gallon water bottle 12 is shown in FIG. 1. For example, a bottle 12 having an outer diameter of approximately 10.75 inches is believed to be suitable with a chute 24 having an inner diameter of approximately 11.125 inches. This bottle can have a carrying handle as is known in the art, although some bottles do not have handles. It is appreciated that the present invention is contemplated for use with different type bottles, including, but not limited to, propane tanks of the type used with home grills.

With particular reference to FIGS. 2, 3, 4 and 11, a bottle stop 34 is provided in an opening 36 (see FIG. 4) formed in the chute wall 30. The bottle stop 34 is pivotally attached to the chute wall 30 via a spring hinge 38. The hinge 38 includes a stationary section 40 fixedly attached via screws or rivets to the chute wall 30, and a pivotal section 42 that pivots relative to the stationary section 40 about the hinge pin 44. The spring is configured to urge the pivotal section 42 towards the internal portion of the chute (to engage a bottle 12 therein). Stop flaps 46 extend beyond the opening 36 to engage the wall 30 and thereby act as a stop of the movement of the pivotal section 42 into the chute 24. It is appreciated that the spring hinge 38 is configured to urge the pivotal section 42 of the hinge into the opening 36 towards the bottle within the chute 24.

Figure 11:
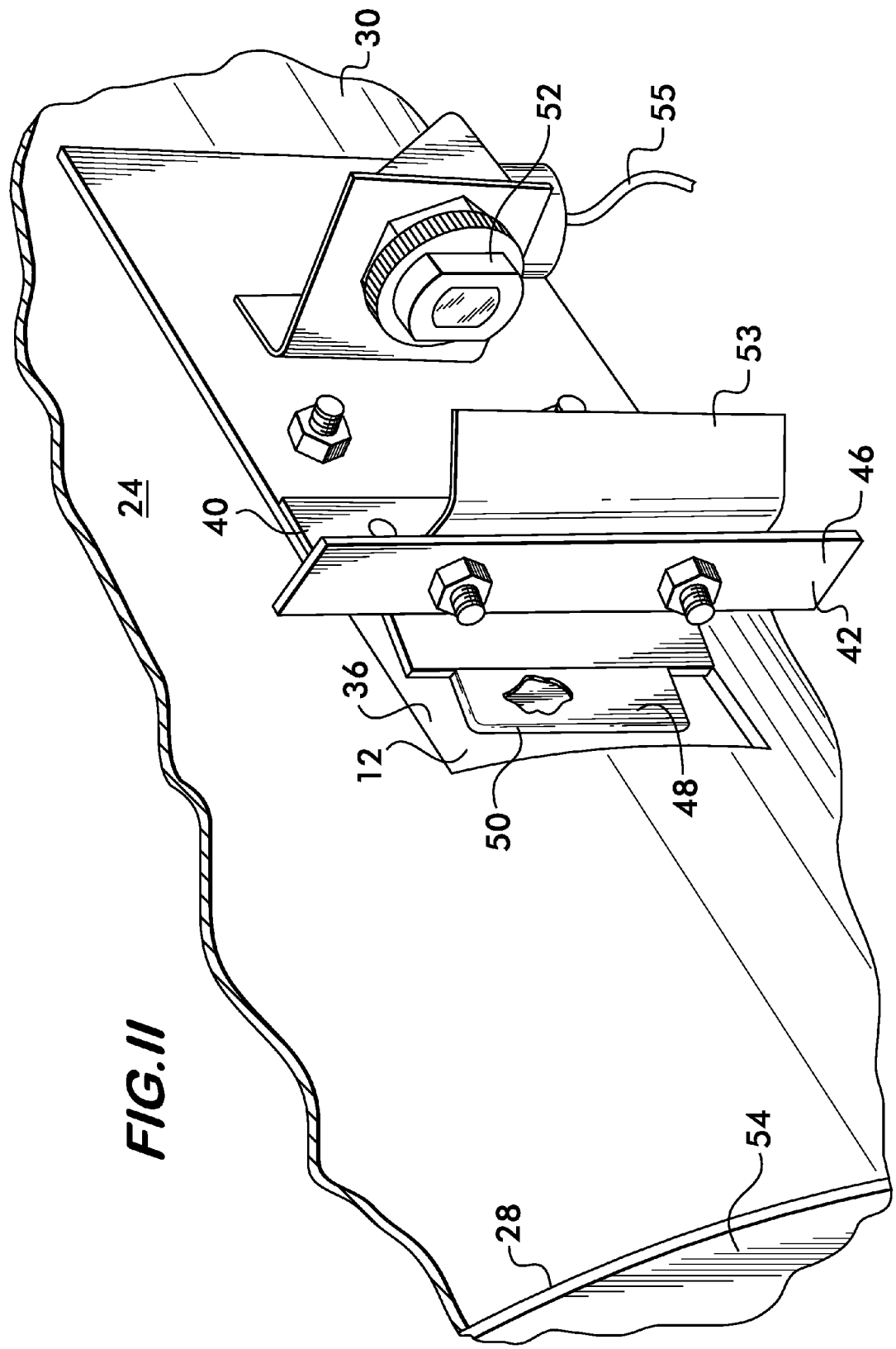

As best seen with reference to FIG. 11, the stop 34 has a stop member 48 attached to and extending from the pivotal hinge section 42 through the opening 36 into the cylindrical chute 24. The stop member 48 may include a rubber piece 50 or any other type of material that can grip the bottle, preferably with high friction. Again, with reference to FIG. 11, as a bottle moves through the chute 24 from right to left it is seen that the bottle engages the stop member 48, pushing the stop member 48 so that it pivots leftward (away from the chute inlet 26 and towards the outlet 28) against the urging of the spring of the hinge as the bottle slides past and against the stop member 48. Should the person inserting a bottle attempt to pull the bottle back out of the chute (in a rightward direction), the stop member 48 will pivot rightward to grippingly engage the bottle with the stop member 48 engaging one side of the bottle and the opposite side of the bottle being pushed by the stop member 48 against the inside wall of the chute 24 to prevent movement of the bottle 12. Thus it is seen that at this position the bottle can be "gripped" between the stop member 48 and the opposite side of the inner chute wall (as discussed below, as the bottle moves further down the chute, the bottle will be gripped between the stop member 48 and other members). Moreover, it is appreciated that the harder one pulls on the bottle in a rightward direction, the tighter the grip of the stop member 48 as the stop member 48 attempts to rotate back into the chute 24, more tightly clamping the bottle between the stop member 48 and inside wall of the chute 24, and thereby increase the grip on the bottle. Moving the bottle again to the left as oriented in FIG. 11, the stop 34 would again rotate leftward towards the outlet 28 of the chute to allow the bottle to pass. The stop 34 and associated members can be made of any suitable material, such as metal for strength. The stop member 48 can be a rubber or polymeric sleeve over a metal member.

Figure 4:
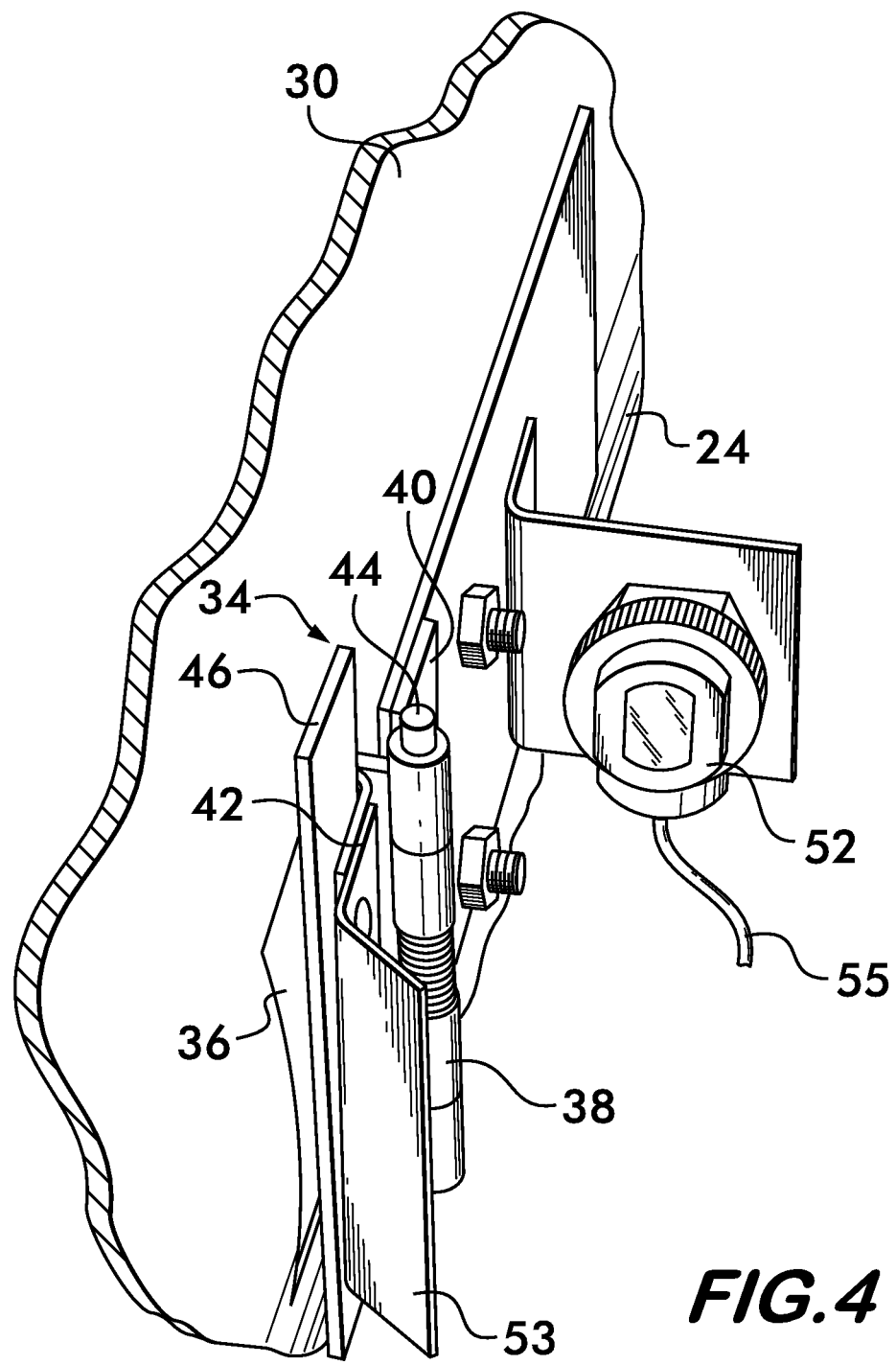
FIG. 4 is an enlarged view of the side shown in FIG. 2 showing an optical sensor and a bottle stop.

With reference to FIGS. 2 and 4, a sensor 52 is provided to sense the passing of the bottle at a particular position as further described below. In the illustrated embodiment, the sensor 52 takes the form of an optical sensor mounted to the chute wall 30 via a bracket adjacent to the spring hinge 38 and which is positioned to sense the movement of the stop member 48 attached to the pivotal section 42 of the hinge 38 as the bottle moves past and engages the stop member 48. As discussed above, the bottle stop 34 engages the bottle 12 as it moves past it such that the bottle stop moves outwardly away from the bottle. A deflector section 53 attached to and moving with the pivotal hinge member 42 interferes with the optical beam from the sensor 52 to indicate that the bottle has reached this particular position within the chute 24. Any suitable sensor can be used, e.g. mechanical and magnetic sensors. In the present embodiment, it is believed advantageous to combine the optical sensor with the stop so that movement of the stop member 48 is detected by the optical sensor. It is appreciated, however, that other configurations would allow the optical sensor to work independent of the stop. The sensor 52 is powered and communicates via cable 55 with other devices, such as the indicator 18 which can include a controller and/or a receipt (e.g., ticket) dispensing device. As further discussed below, the indicator communicates with various devices to receive data therefrom, and provides an indication that a bottle was received based on a predetermined sequence of events.

Figure 5:
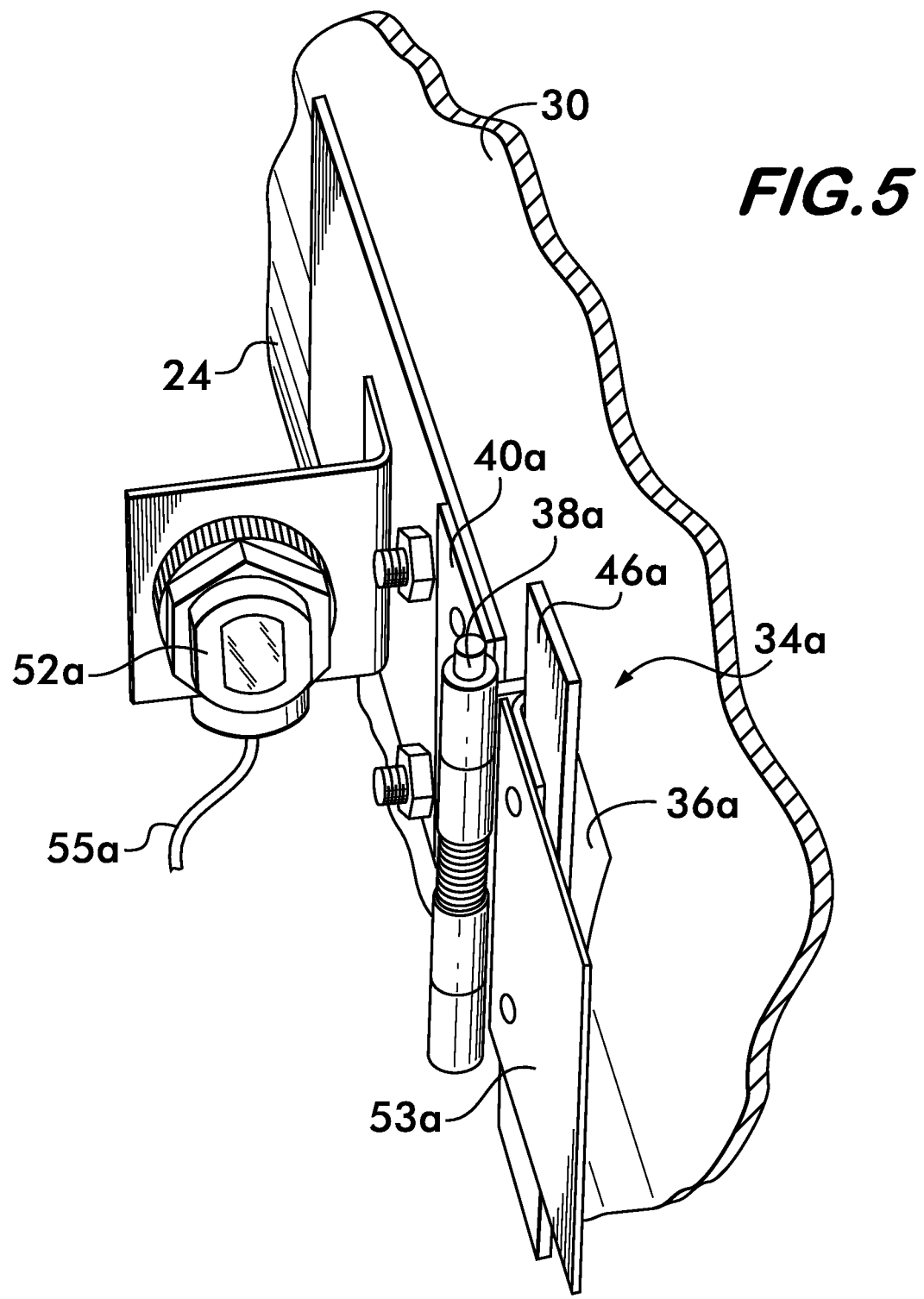
FIG. 5 is a large view of the side of the apparatus of FIG. 1A from the opposite side of that shown in FIG. 2 and which shows another optical sensor and another bottle stop.

With reference to FIG. 5, provided on the opposite side of the chute 24 is a second bottle stop 34a and a second sensor 52a which are identical to the first stop 34 and the first sensor 52 described above with the exception that the second stop 34a and second sensor 52a are spaced longitudinally from the first stop 34 and the first sensor 52, e.g., in the illustrated example the second stop 34a is positioned longitudinally further away from the inlet of the chute 24 than is the first stop 34 such that the second stop and second sensor would be operated by the bottle after the bottle travels further towards the outlet 28 or at a time after the operation of the first stop and first sensor. Elements of the second stop 34a and second sensor 52a similar to those of the first stop 34 and sensor 52 are indicated with the same reference numerals succeeded by the letter "a". In one preferred embodiment the second stop 34a is positioned about ⅝ of an inch further towards the outlet 28 relative to the first stop. Other distances may be suitable. The two stop members 34, 34a are placed preferably on opposite sides of the chute 24 so that the two stops can cooperate to provide sufficient stopping force on the bottle 12 should someone attempt to remove a bottle through the chute, although the first stop member alone, clamping the bottle between the stop member and the chute wall 30, is believed to be capable of effectively gripping the bottle. The two stops 34, 34a are about ⅝ of an inch from one another lengthwise between the opening 26 and outlet 28 of the chute 24 so that the sensors operate in a sequence i.e. the first sensor will sense the bottle 12 before the second sensor in a predetermined sequence. This has some advantageous features as further discussed below. Thus, in the preferred embodiment, it is seen that the first and second stop members 34, 34a are spaced from one another for the purpose of allowing the sensors to detect the bottle at different positions within the chute. In some configurations, such as where the stop members and sensors were configured to work independent from one another, it is contemplated that the first and second stop members would not need to be spaced longitudinally from one another while the first and second sensors would be spaced longitudinally from one another to provide the desired detection sequence.

Figure 6:
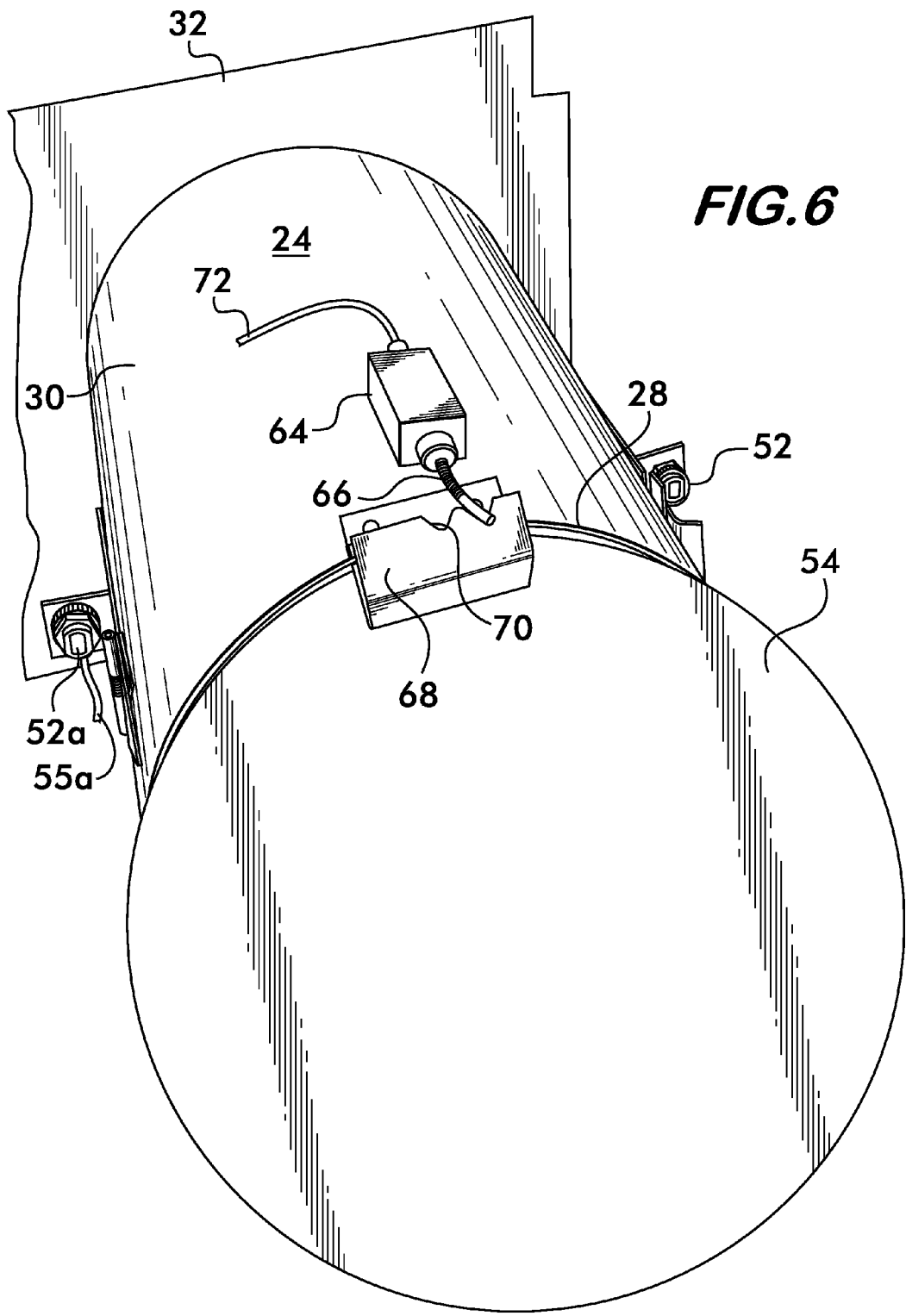
FIG. 6 is a rear perspective view of the apparatus of FIG. 1A showing a hinged flap and a mechanical sensor on top of the chute.
Figure 13:
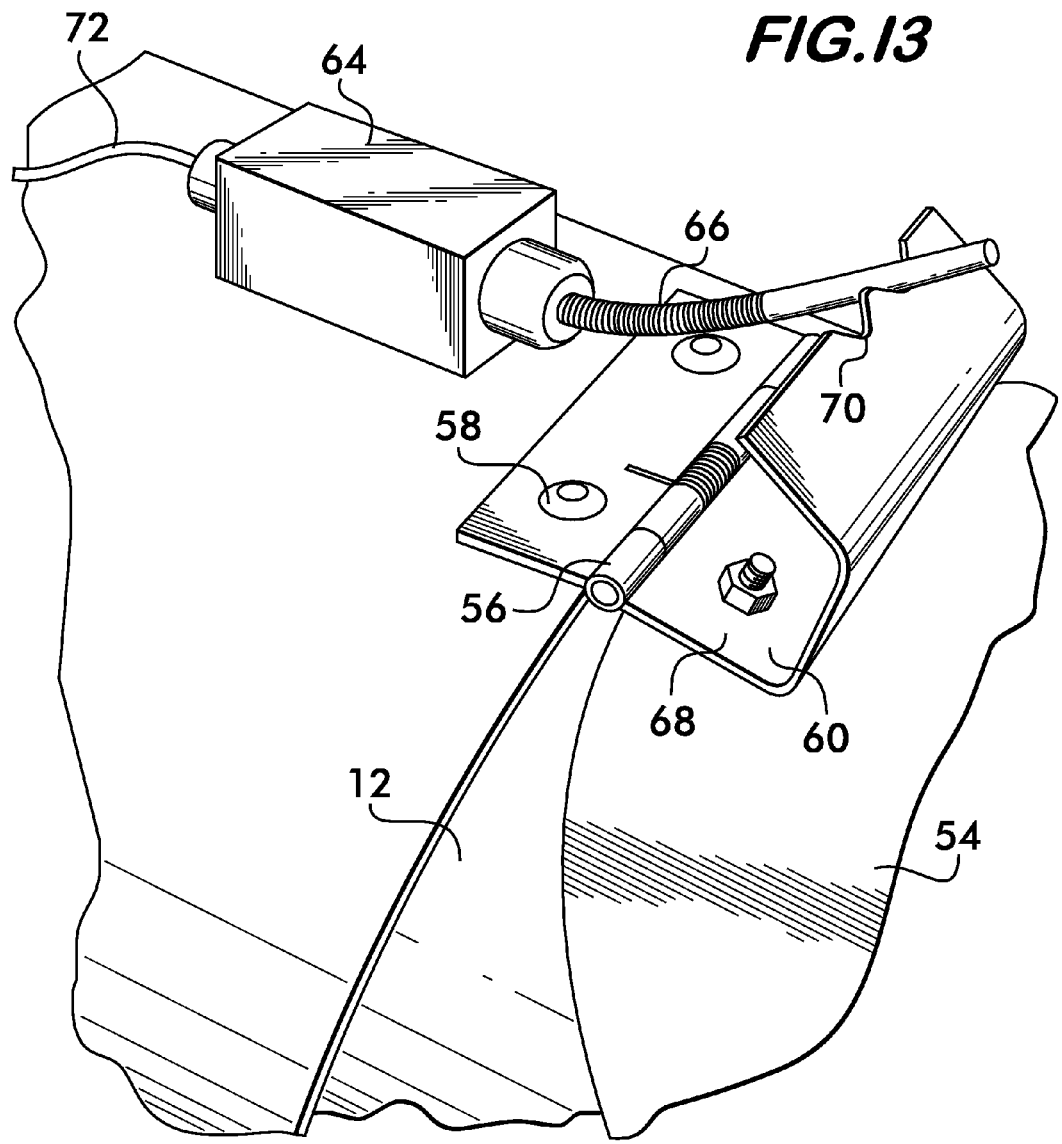
Figure 14:
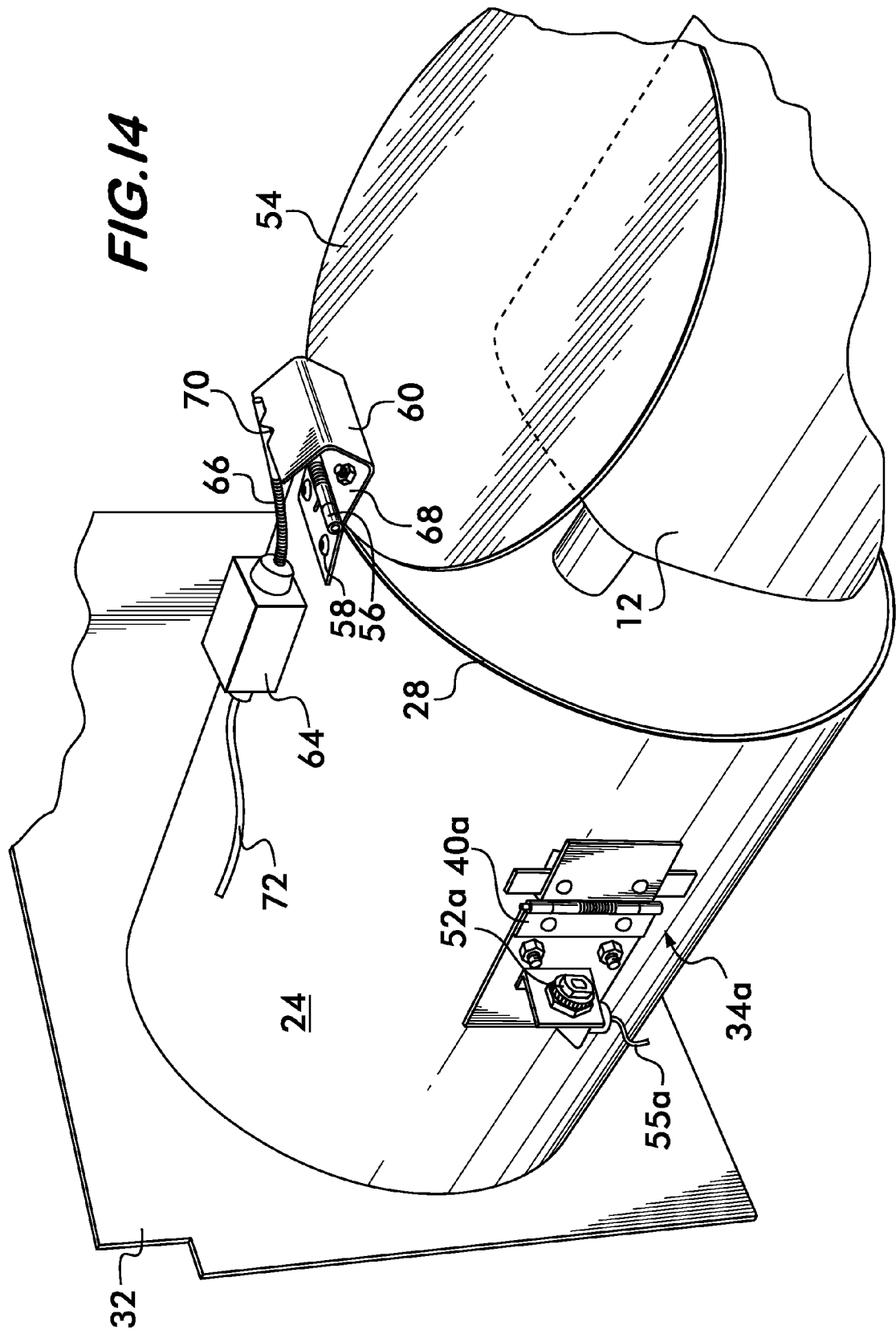
Figure 15:
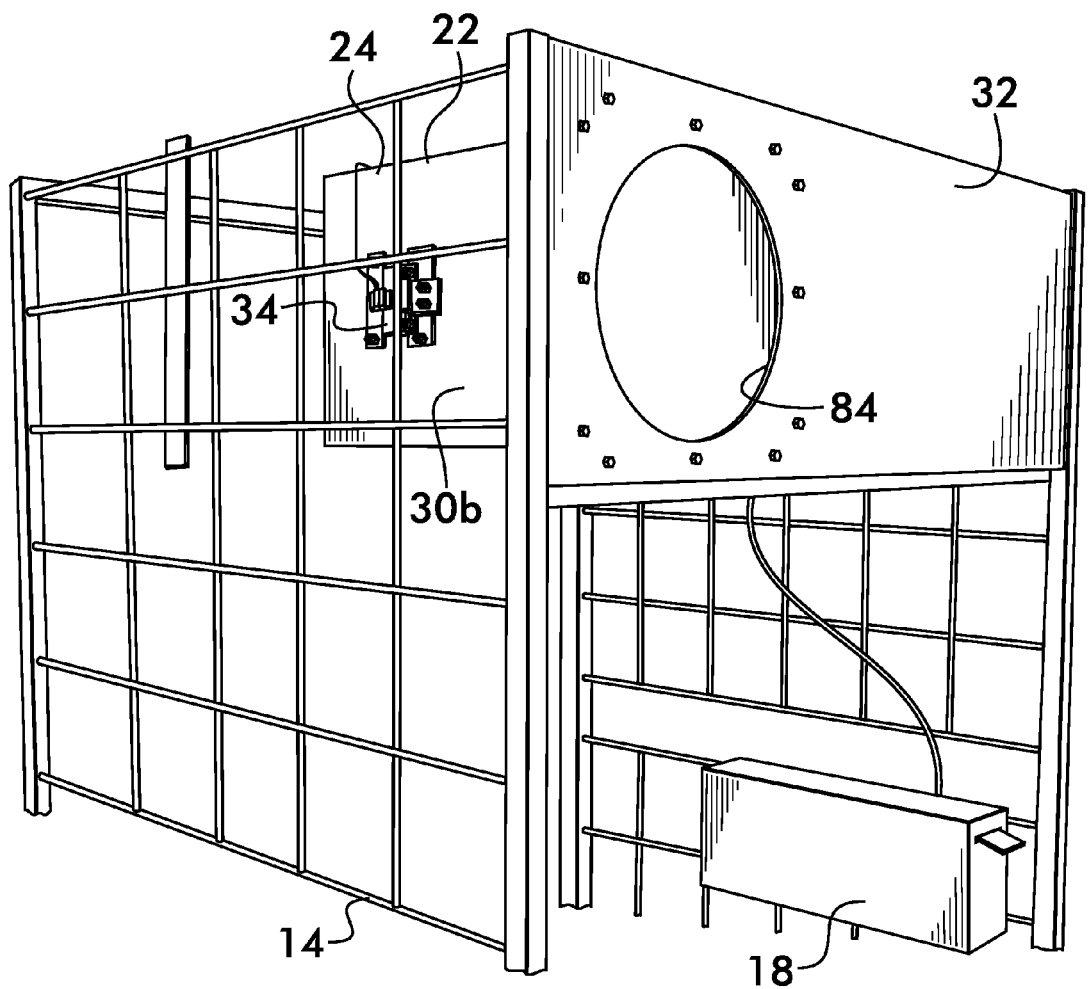
FIG. 15 is a perspective view of a bottle collection device in accordance with a second embodiment of the present intention.

With reference to FIGS. 6, 13 and 14, a circular flap 54 positioned to cover the outlet opening 28 is pivotally attached to the top of the chute wall 30 via a hinge 56 having a stationary section 58 attached to the chute wall 30, and a moveable section 60 attached to the flap 54. The flap 54 opens by pivoting about the hinge 56, returning via a hinge spring 62 to a position covering the outlet opening 28. The flap 54 can be made of a plastics material, or any other suitable material.

Figure 7:
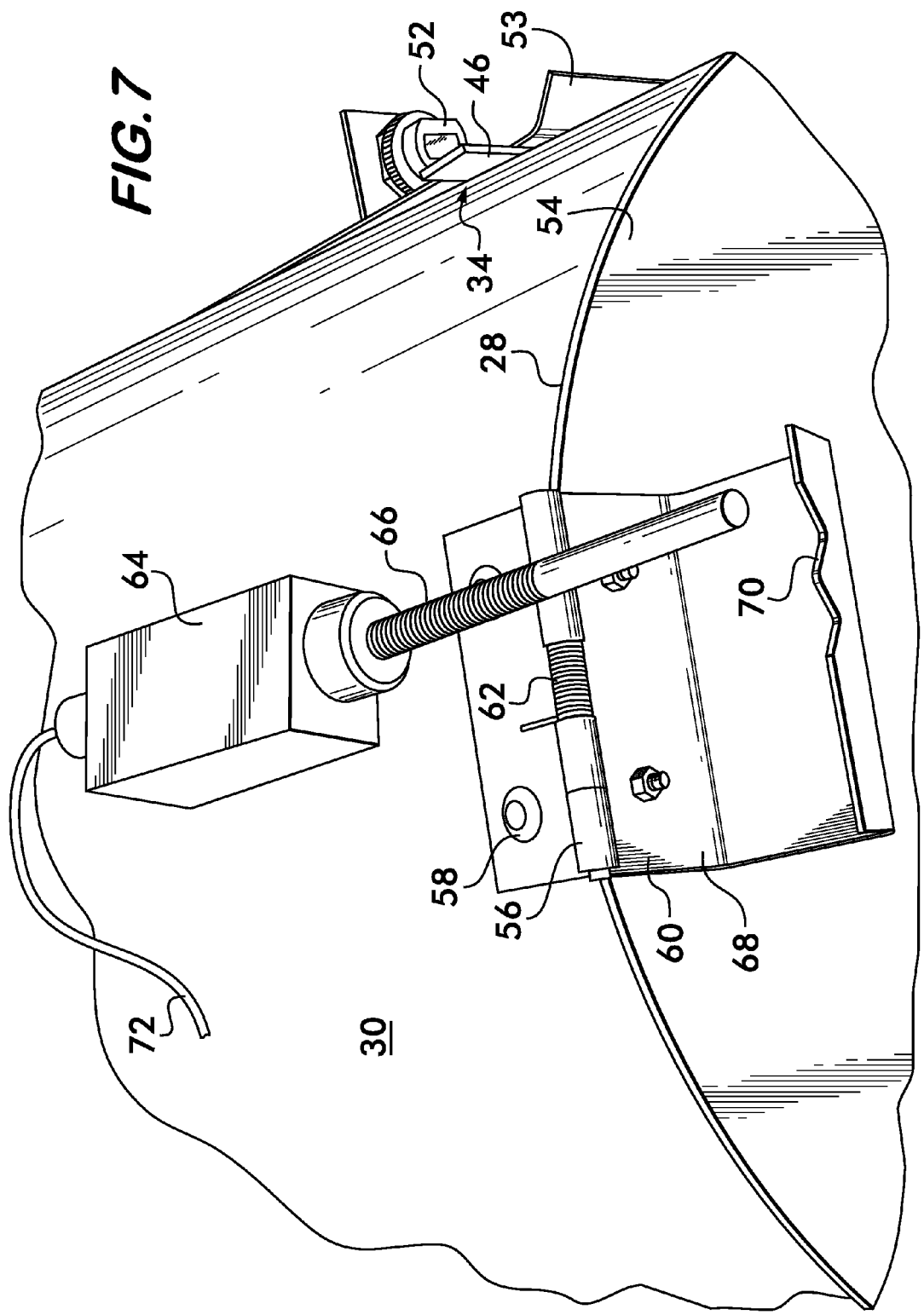
FIG. 7 is an enlarged view of the mechanical sensor and top portion of the flap shown in FIG. 6.

With reference to FIGS. 3, 6 and 7, a third sensor 64 is provided on the top of the chute 24 near the outlet 28 so as to detect a bottle 12 exiting the chute outlet 28. In the preferred embodiment, this third sensor 64 is a mechanical sensor having a displaceable contact arm 66 that is moveable from a rest first position (extending straight out as seen in FIG. 7) to a second position (displaced as seen in FIG. 13). This sensor 64, as known in the art, is capable of providing signals to indicate whether the arm 66 is in the first or second positions. Attached to the moveable section 60 of the hinge 56 is an extension member 68 having a v-shaped notch 70 that engages the tip of the arm 66 therein, configured to move the arm 66 between the first and second sensor positions as the flap moves respectively from a position closing the outlet opening 28 (FIG. 7) to a fully open position (FIG. 14) when the bottle is exiting the outlet opening 28. Although a mechanical sensor is illustrated, other forms of sensors can be used to detect movement of the bottle through the outlet 28. The hinge extension 68 can be made of any suitable material such as metal. The sensor 64 communicates with other devices such as the controller via cable 72.

The three sensors 52, 52a, and 64 communicate with a controller device (not shown) which can be used to perform various functions, such as controlling a ticket dispenser to dispense a ticket as proof that a bottle was received by the device 10. Any know devices can be used, such as a ticket dispenser provided by Deltronic Labs Inc., model number DL-4-SS. Any suitable controller can be used to read the signals and cause the dispensing of a ticket. In one preferred embodiment a Microchip P1C16C627A microprocessor is used. The controller receives the signals from the optical sensors 52, 52*a*, and mechanical sensor 64, and can be positioned within the dispenser or a separate controller as known in the art. For example, the controller can include a programmable chip programmed to actuate the dispenser when the sensors indicate bottle movement in the preprogrammed sequence as discussed below.

In the present embodiment, the three sensors are used in an advantageous manner to prevent false signals and to provide security against tampering to obtain a ticket without first returning a bottle. The three sensors 52, 52*a* and 64 must detect the bottle in a predetermined sequence or a ticket will not be dispensed. In the illustrated embodiment, the first sensor 52 must be activated first, followed by the second sensor 52*a*, followed by the third sensor 64. If this sequence takes place, then a ticket will be dispensed. Any other sequence or failure of any or all sensors to detect the bottle, and a ticket will not be dispensed. Additionally, it can be required that the sensor indications must be provided within a given time period or a ticket will not be dispensed. For example, if the third sensor 64 on the flap does not provide a bottle indication signal within a certain predetermined time period after a signal is received from the first or second sensors 52 and 52*a*, as would happen if someone were tampering with the device, the controller would not dispense a ticket even if the third sensor 64 were eventually to send a bottle indication signal. The system would simply reset and the entire proper sequence would have to be carried out for a ticket to dispense. Likewise, if the second sensor 52*a* does not detect the bottle 12 within a predetermined time period after the first sensor 52 detects the bottle, the system can be programmed to reset.

Another advantage is that false indications are prevented. For example, should light from lightening cause an optical sensor to provide a false indication of a bottle, both optical sensors (the first and second sensors 52 and 52*a*) will likely do so at the same time, contrary to the sequence required to dispense a ticket. Moreover, without an indication from the third mechanical sensor 64 in the proper sequence, a ticket will not be dispensed. Likewise, should something move across the field of an optical sensor, such as a wind blown object, without indications from the other two sensors in the required sequence, a ticket will not be dispensed. Thus it is appreciated that someone trying to cheat the apparatus by moving their hand or other objects within the chute to create false signals from the sensors would find the task difficult if not impossible, particularly since they cannot see the sensors from outside of the apparatus 22, and more so if they do not know how the system works or the required sequence of sensor indications. Moreover, should someone try to cheat the apparatus by moving a bottle in and out of the chute 24, the bottle stops 22 and 22*a*, engaging opposite sides of the bottle, would prevent movement of the bottle back out from the inlet.

Figure 8:
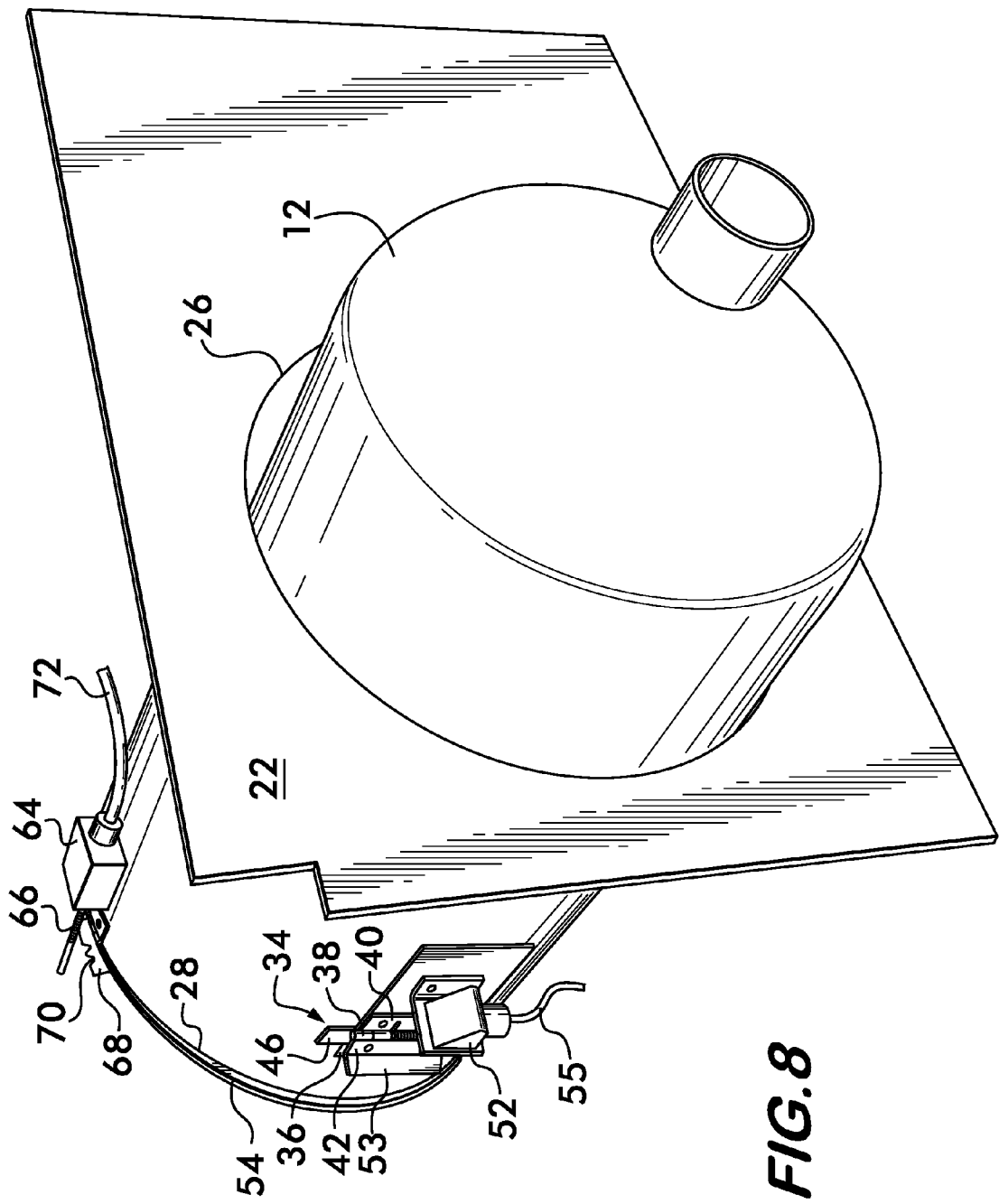
FIGS. 8 thru 14 illustrates the movement of an empty bottle through the apparatus of FIG. 1A as follows.
Figure 9:
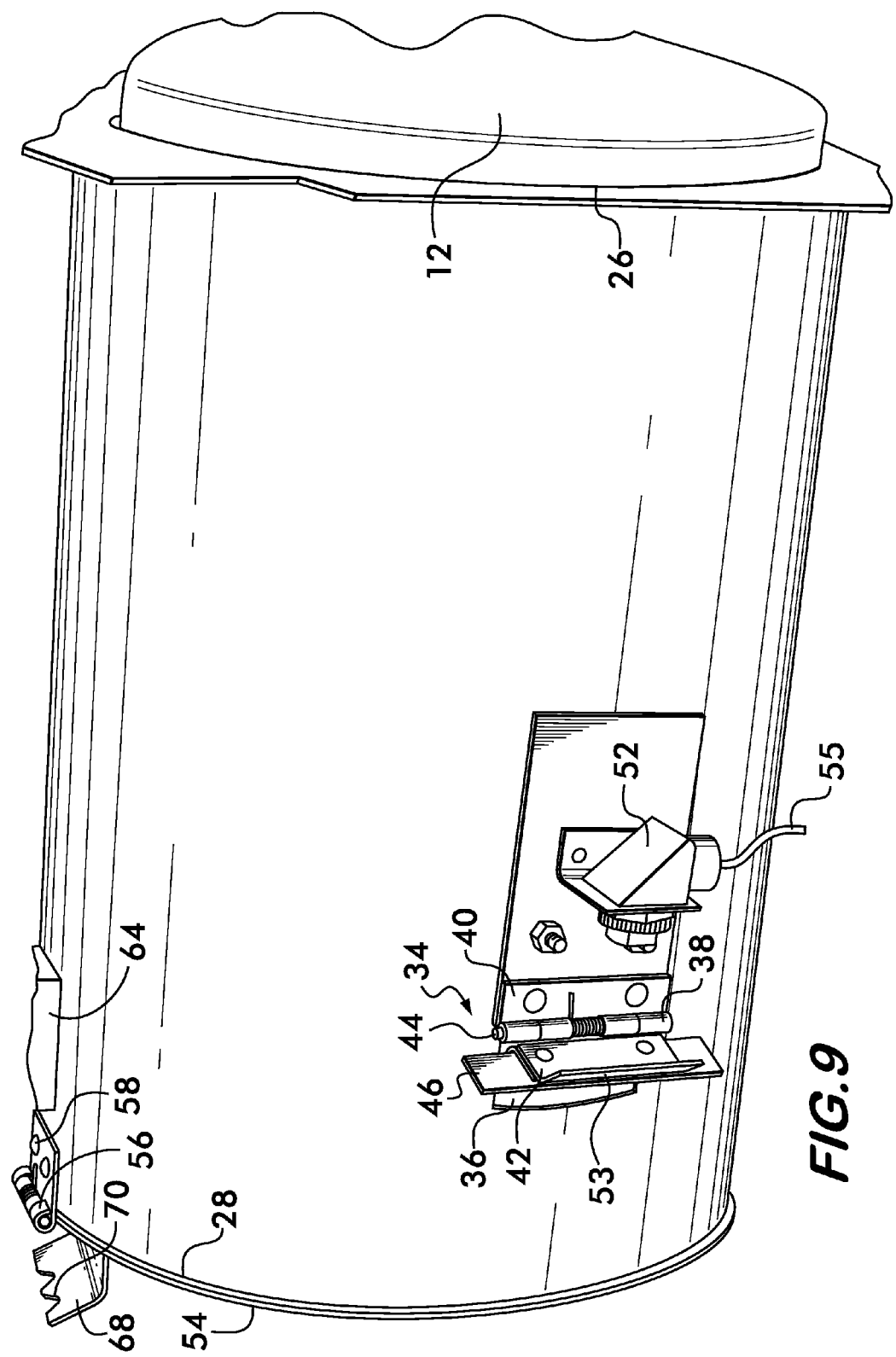
Figure 10:
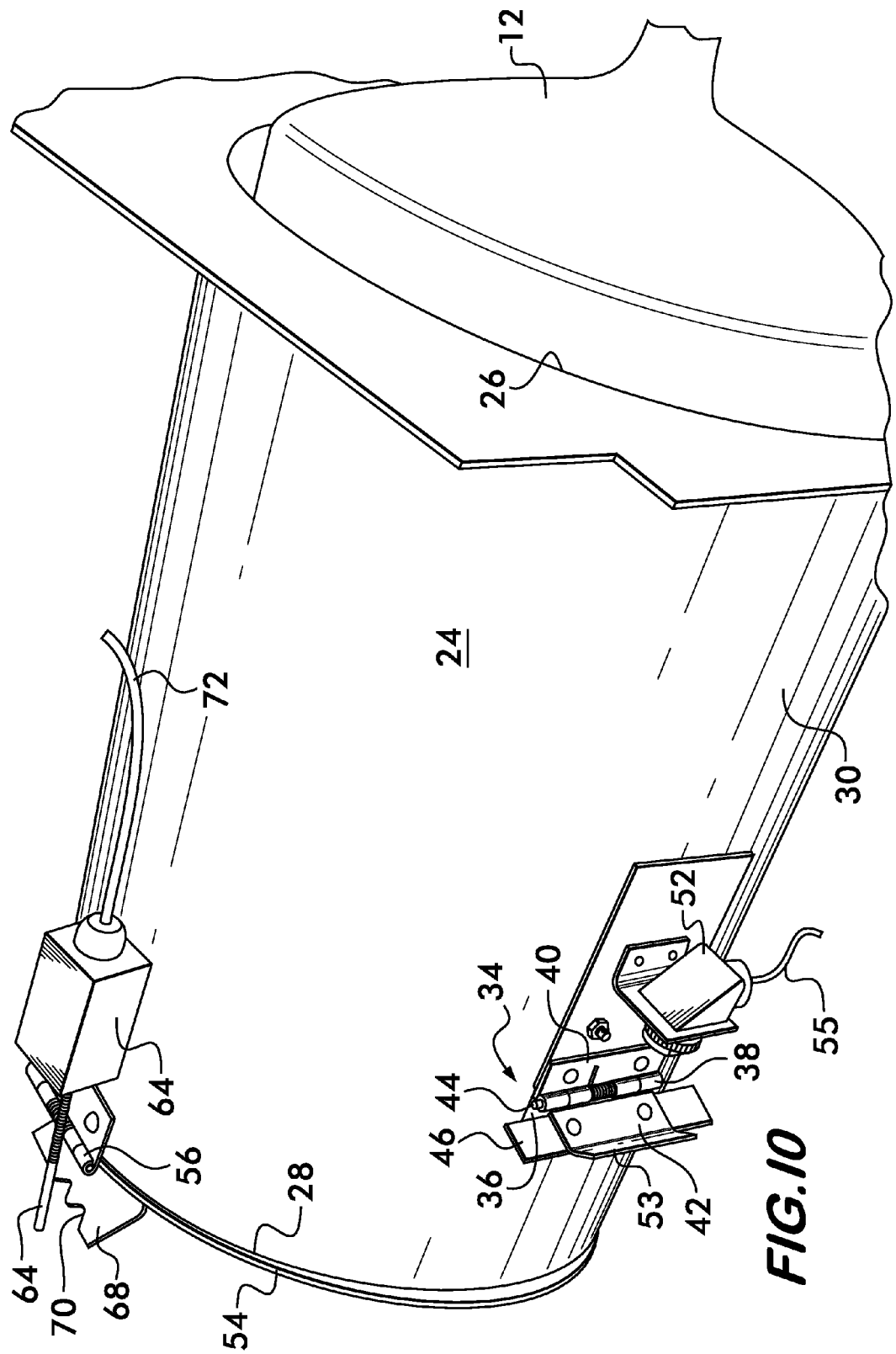

The use of the present invention is now illustrated with reference to FIGS. 8 through 14. As shown in FIG. 8, an empty water bottle 12 is inserted bottom first by the user into the inlet opening 26 of the chute 24. Then, as seen in FIGS. 9, 10, and 11, the bottle 12 is pushed towards the rear of the chute 24 where it will engage first the bottle stop 34 and optical sensor 52. The bottle will push the stop member 48 and thereby push the deflector 53 into the path of the optical sensor 52 such that the sensor 52 will send a signal to the controller indicating that the bottle has reached the first stop 34. As the bottle 12 continues to move, it engages the second stop 34*a* and causes the second optical sensor 52*a* to signal the controller that the bottle has reached the second stop 34*a*.

Figure 12:
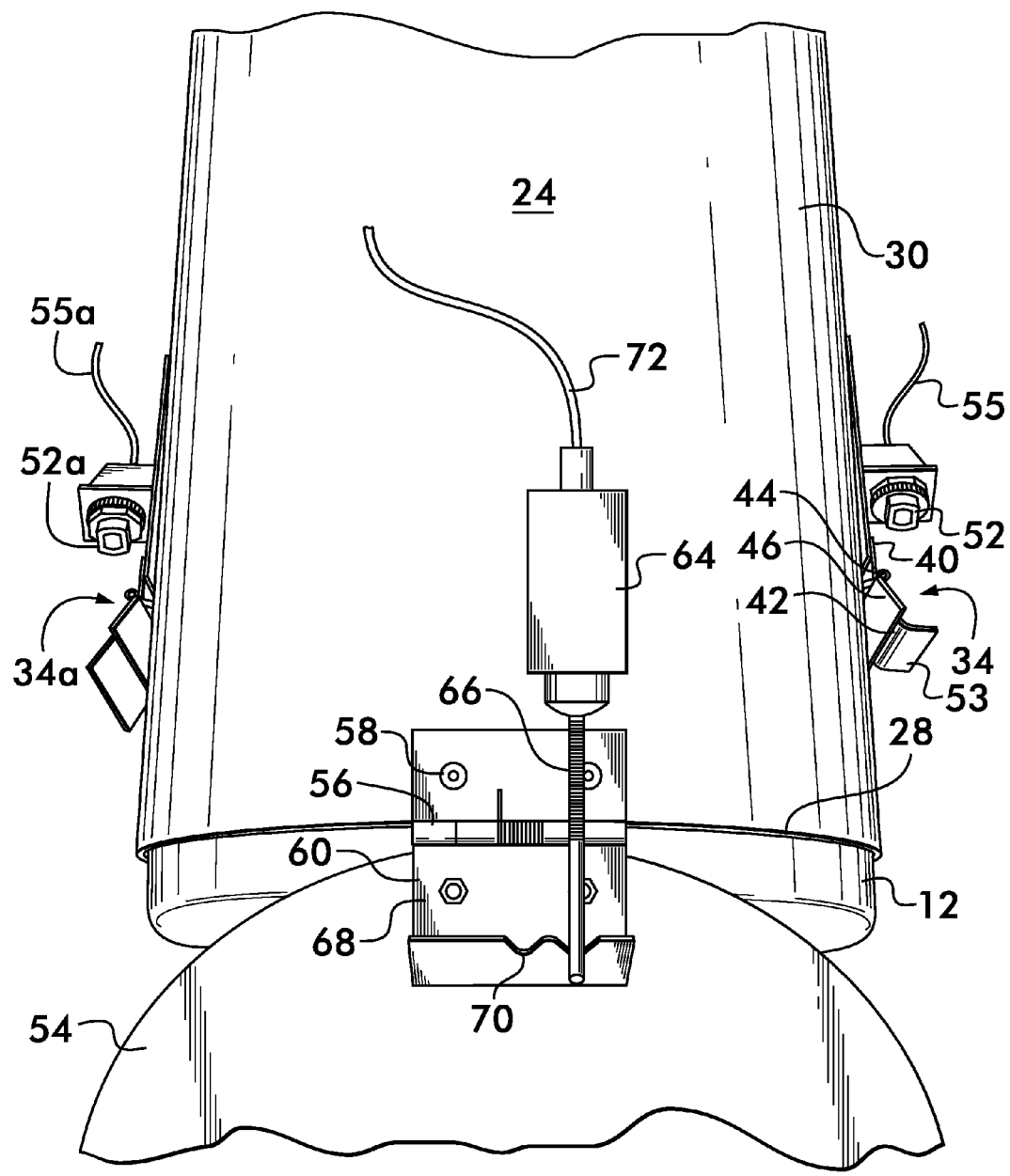

With reference to FIGS. 12, 13, and 14, it is seen that the bottle 12 is ultimately pushed out of the chute 24 through the outlet 28. This causes the flap 54 to move upwardly thereby causing the sensor arm 66 to move so as to signal the controller that the bottled 12 has reached this position. The bottle 12 then falls from the opening 28 into a holding bin where the containers are securely stored (see e.g., FIG. 1). As long as the controller receives the sensor signals in the predetermined order and timing, it will operate the ticket dispenser 14 to release a ticket or whatever else is to be dispensed.

Another preferred sequence of events is now described. In this embodiment the unit is disabled for about 1 second after the dispensing of a ticket for a returned bottle. A customer places the next bottle 12 into the inlet opening 26 of the chute 24 bottom first and pushes the bottle towards the outlet 28.

(a) As the bottle moves, first the bottle stop 34 is engaged and the first sensor 52 detects the bottle.

(b) Next the bottle will engage the second stop 34*a* and the second sensor 52*a* detects the bottle, at which event the first sensor 52 must still detect the bottle, and the unit must be enabled (see above—the unit is disabled for about 1 second after a ticket is released). If all these conditions are true then a flag is set to indicate this for step (c). This flag is reset after a ticket is dispensed.

(c) Next the third sensor 64 detects the bottle, and the unit must be enabled and the flag set in step (b) must still be set.

(d) After pushing the bottle through the outlet 28, the third sensor 64 stops detecting the bottle, indicating that the bottle has passed the third sensor 64. When this occurs, a timer for about 255 ms is started.

(e)(1) If the first and second sensors 52 and 52*a* detect a bottle before the timer of step (d) times out, then the timer is reset and no ticket is dispensed. The sequencing checker subroutine goes back to step (c).

(e)(2) If the timer that is set in step (d) times out without the first and second sensors 52 and 52*a* detecting a bottle, then a ticket is dispensed. Explanation of step (e) is as follows: The bottle construction is such that when the bottle starts its travel through the chute, the first two sensor switches for sensors 52 and 52*a* will close and stay closed in sequence (a closed sensor meaning a sensor that detects the bottle; an open sensor meaning that the sensor does not detect the bottle). After that, the first and second sensors 52, 52*a* may open and close randomly for short periods due to ridges and other inconsistencies in the middle of the bottle. Then the third sensor 64 will close and the first and second sensors 52 and 52*a* may continue to change. As the end of the bottles travel through the chute, first and second sensors 52 and 52*a* will be open and then the third sensor 64 will open (as the flap 54 closes). Since the bottle is now past the flap, the first and second sensors 52 and 52*a* will stay open until another bottle is inserted. If the first and second sensors 52 and 52*a* are closed or close too soon after the third sensor 64 opens then either a new bottle was inserted or the customer may be trying to pull the bottle backwards to get more than 1 ticket (most likely the latter since the time period here is short). This makes it more difficult to cheat (pulling the bottle backwards) by looking for this condition within the time as set in step (d) after seeing the third sensor 64 open. The time 255 ms is preferred in this embodiment since pulling the bottle backwards must be done very quickly before the stop members 34 and 34*a* can work. A longer time could be used, but that may not provide much more security and would also mean a longer wait for the ticket. The longer time would also mean a greater chance that another bottle has been inserted. The time chosen is believed to be a good compromise.

(f) After dispensing a ticket, a second timer is set and started that disables the unit from detecting a bottle and dispensing tickets until this timer times out. This is believed to also to help discourage cheating. As noted above, a preferred time is about 1 second.

Another embodiment of the above described invention is now described with further reference to FIGS. 15 to 21. This embodiment is similar to that described above but has an alternative configuration of bottle stops and sensors. Like parts and elements are referenced with like reference numbers. The bin or cage like structure 14 is similar to that shown in FIG. 1, here the cage being shown with a front cage section removed.

With particular reference to FIGS. 15 to 18, the bottle chute assembly 22 includes a rectangular chute 24, preferably square as shown, sized for use with 3 and 5 gallon plastic bottles. The chute assembly 22 has a front flange 80 with bolt holes 82 extending along the edge of all four chute sides, and further has an inlet opening 26, outlet opening 28, and a chute wall 30 extending between the inlet and outlet openings. The chute wall 30 includes the four side walls 30*a*, 30*b*, 30*c* and 30*d*. The front flat panel 32 of the cage is connected to the inlet side of the chute 24 with bolts via the flange 80, other suitable means of attachment such as welding may be used. A square shaped chute 24 may be preferable as it makes it easier to attach items such as brackets to the outside of the chute. Cylindrical chutes may not be consistent in shape (roundness) and thus brackets and other items to be attached may have to be modified for each unit. Square chutes 24 for receiving the bottles can be more consistently made. The front panel 32 has a round opening 84 overlaying the square chute behind it.

Figure 16:
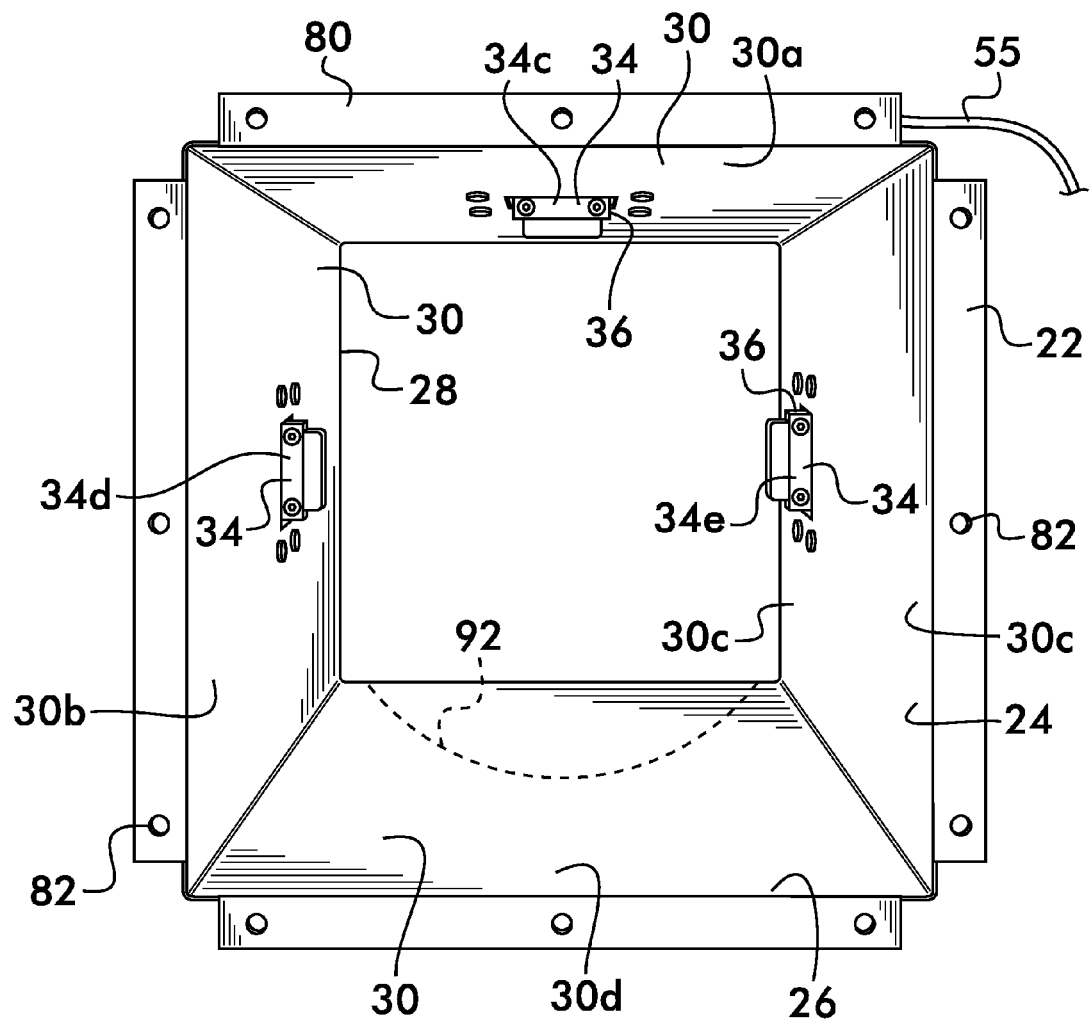
FIG. 16 is a front perspective view of a bottle return chute of the apparatus of FIG. 15 shown removed from the cage.
Figure 17:
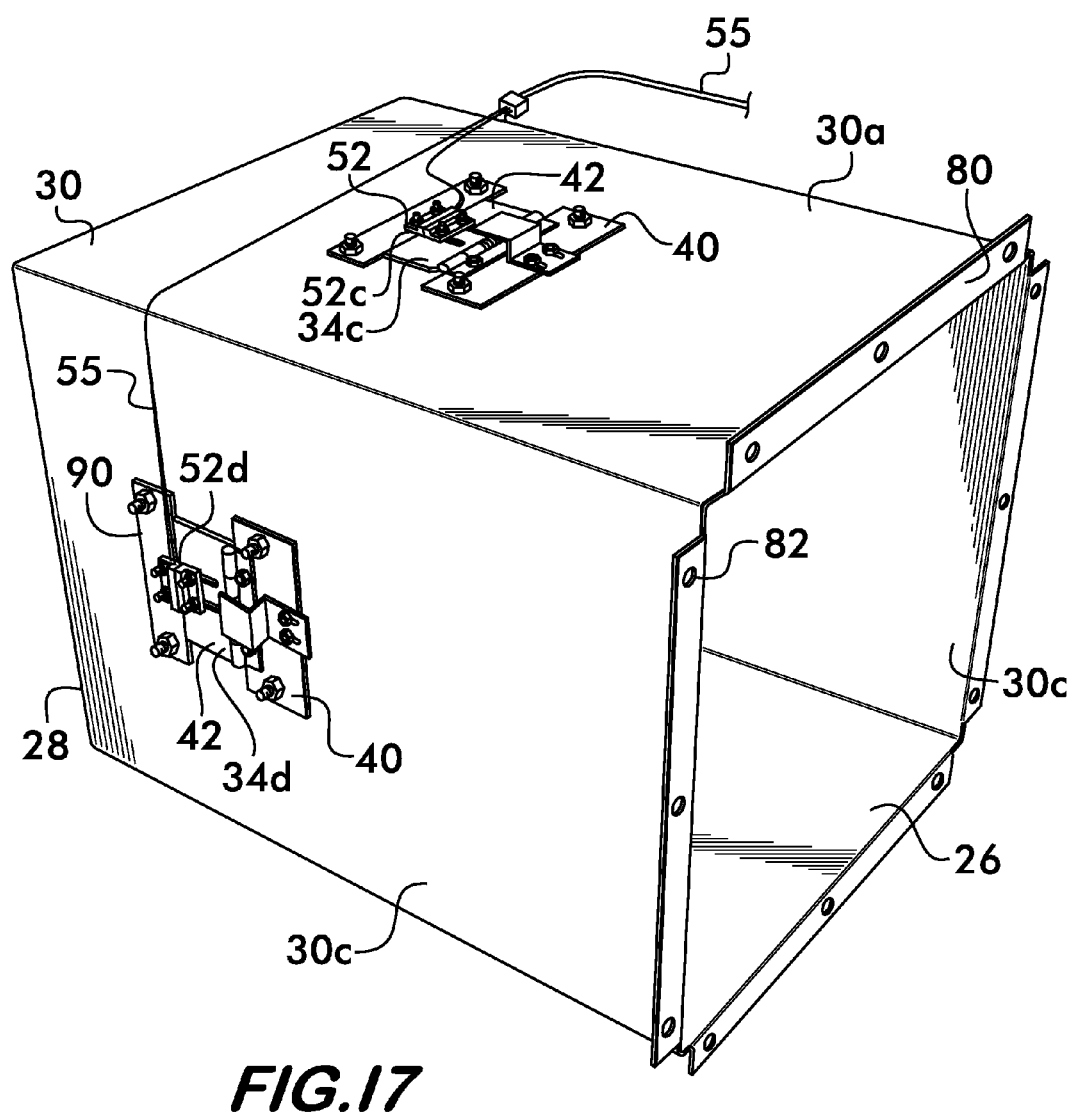
FIG. 17 is a side perspective view of the bottle return chute shown in FIG. 16.
Figure 18:
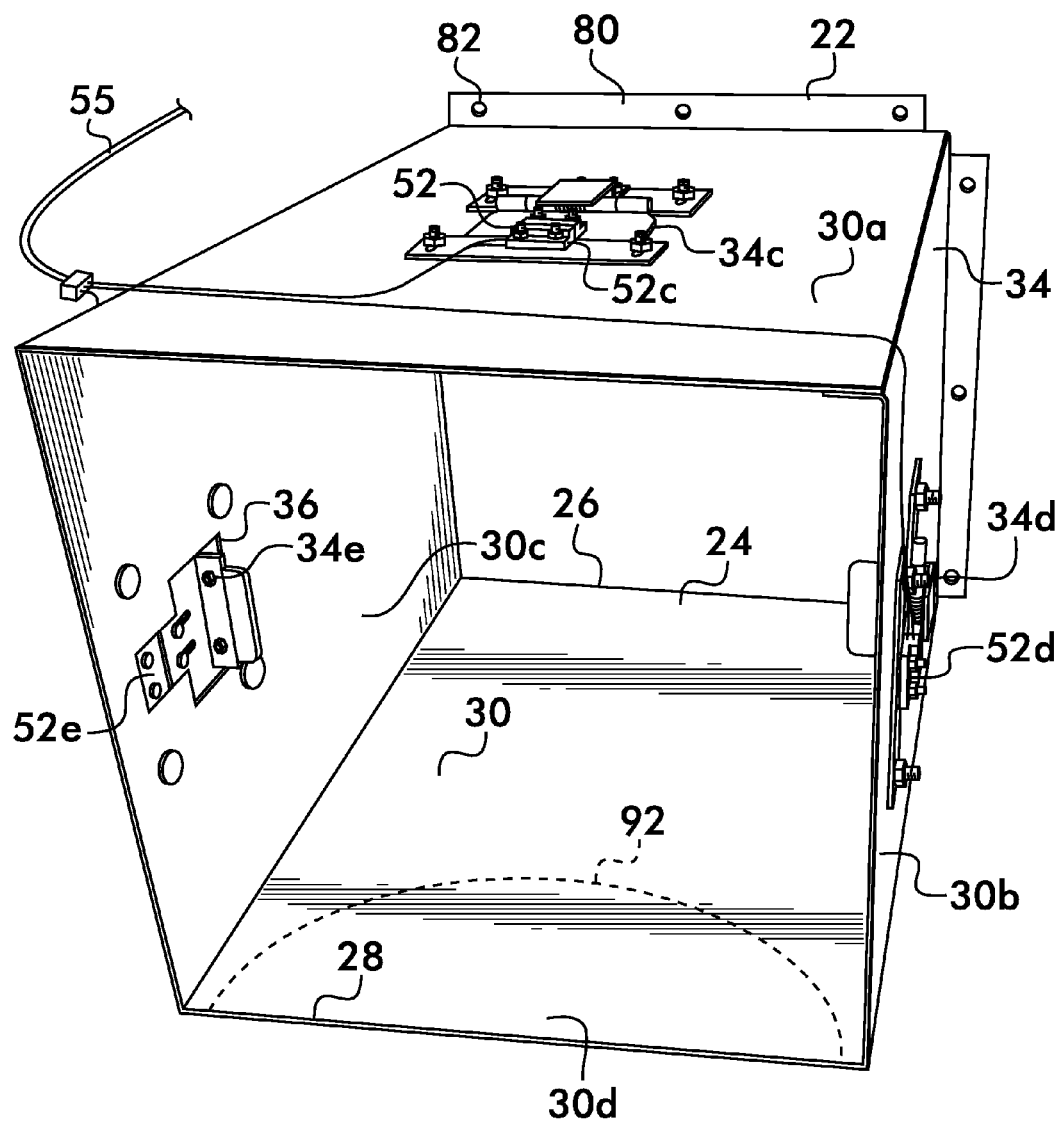
FIG. 18 is a rear side perspective view of the bottle return chute shown in FIG. 16.

In this embodiment, three bottle stops 34 are provided in openings 36 provided in the chute wall 30. A first stop 34*c* is provided on the first side wall 30*a* (here the top wall), a second stop 34*d* is provided on the side wall 30*b* (the left side as seen in FIG. 16), and the third stop 34*e* is provided on a third side wall 30*c* (the sided opposite the second side wall). The stops 34 (34*c*, 34*d*, and 34*e*) of the present embodiment are similar and thus only one will be described.

Figure 19:
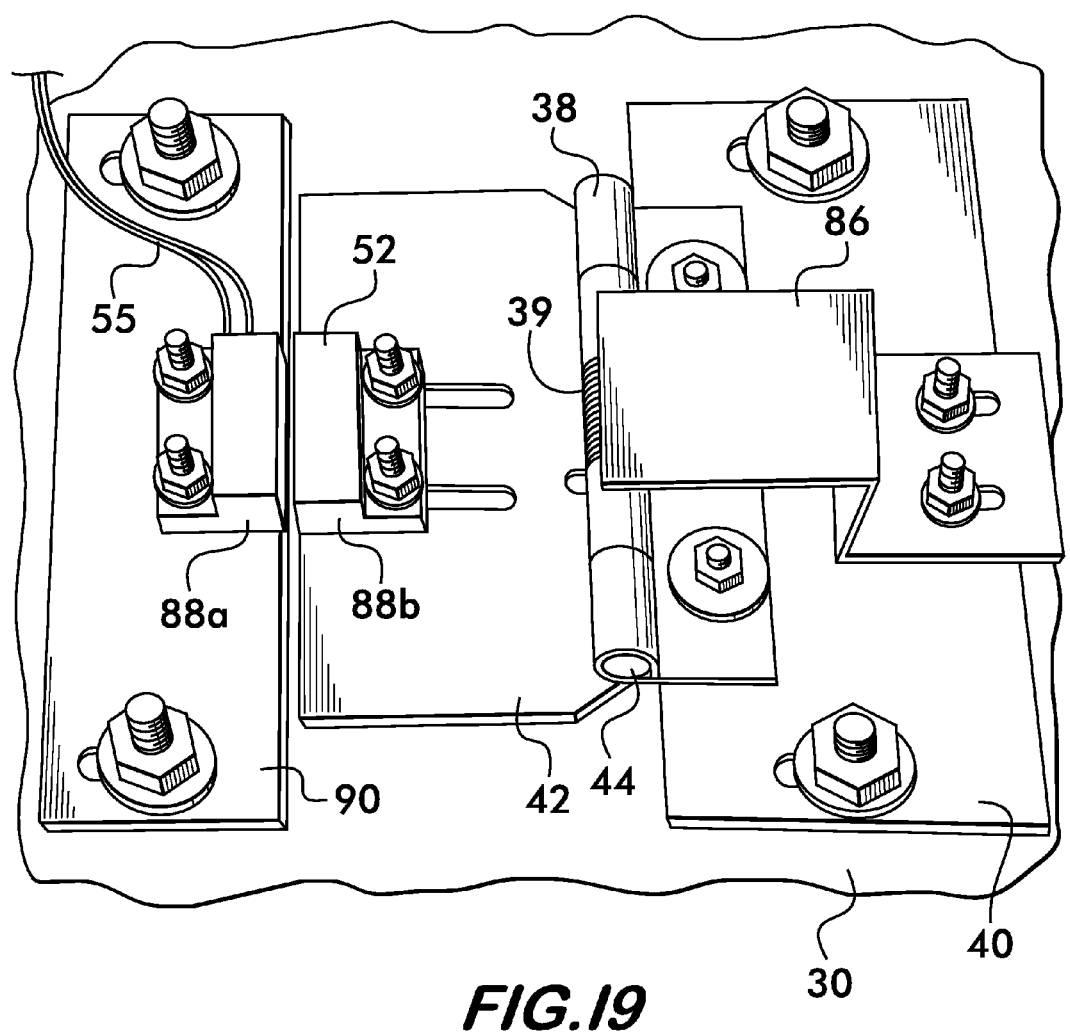
FIG. 19 is an enlarged view of the side of the chute shown in FIG. 16 showing an a bottle stop and sensor assembly.
Figure 20:
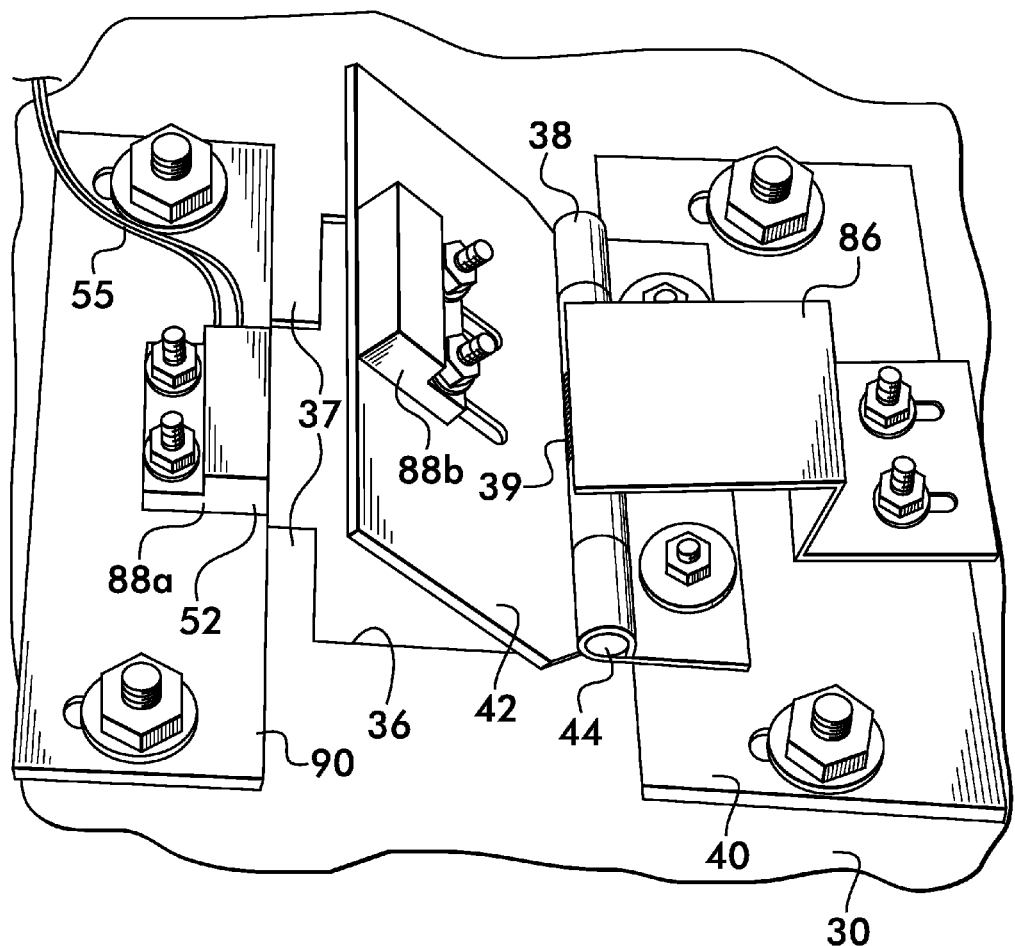
FIG. 20 is a view similar to that of FIG. 17 showing the bottle stop and sensor assembly in a partially opened position.
Figure 21:
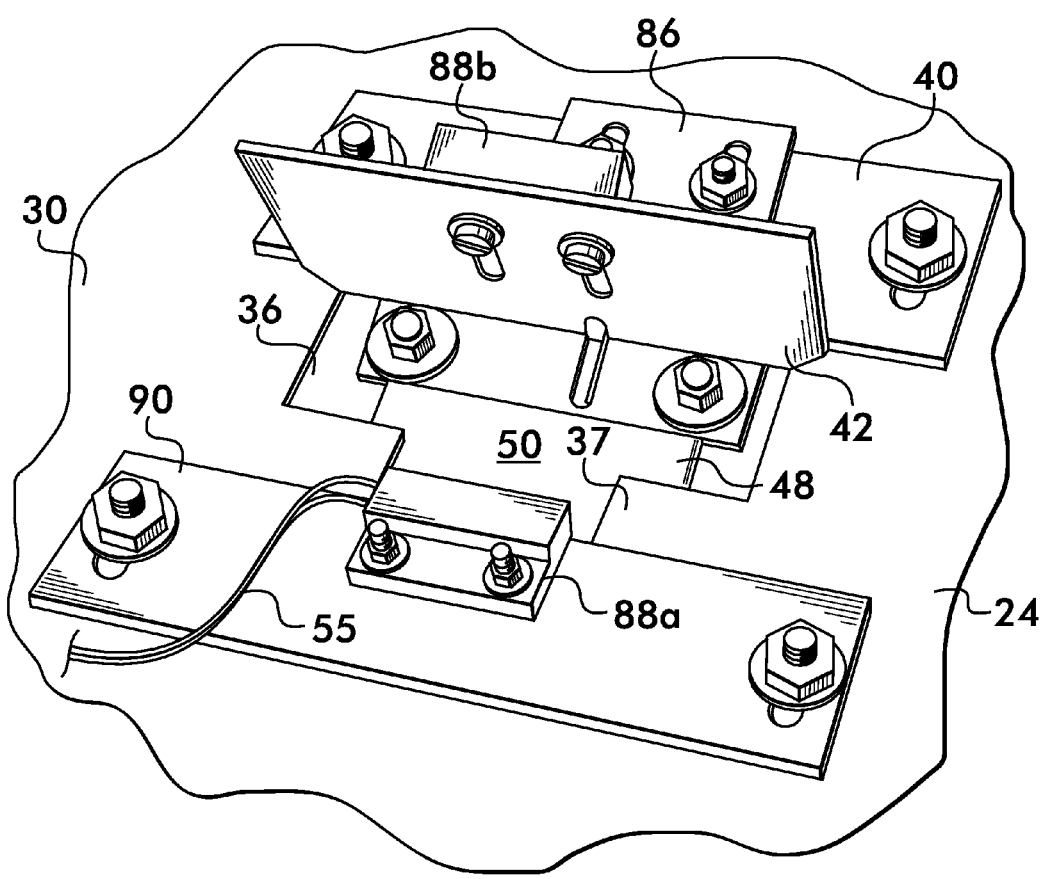
FIG. 21 is a view similar to that of FIG. 19 taken from a different angle and showing the bottle stop and sensor assembly in a fully opened position.

With further reference to FIGS. 19 to 21, each stop 34 is pivotally attached to the chute wall 30 via spring hinge 38 having a stationary section 40 fixedly attached via screws, bolts, rivets or the like to the chute wall and a pivotal section 42 that pivots relative to the stationary section 40 about hinge pin 44. The spring 39 of spring hinge 38 is configured to urge the pivotal section 42 towards the internal portion of the chute. In this embodiment, the opening 36 in the chute wall is configured to form stops 37 (FIGS. 20 and 21) that stop movement of the pivotal section 42 into the chute 24. As described above with reference to the previous embodiment, the bottle stop 34 has a stop member 48 attached to and extending from the pivotal section 42 through the opening 36 into the chute 24. It may include a rubber piece 50 or other type of material that can frictionally grip the bottle 12. As a bottle moves through the chute 24, the bottle engages the stop member 48, pushing the stop member 48 so that it pivots away from the chute inlet 26 and towards the outlet 28 against the urging of the spring 39 of the hinge as the bottle slides past and against the stop member 48. The stop member 48 prevents the bottle from being pulled out from the chute inlet as discussed above. A Z shaped bracket 86 attached to the stationary hinge section 40 can be provided to limit the movement of the pivotal hinge section 42 away from the chute. This permits the wall opening 36 to be sufficiently large to allow the stop member 48 to exit the chute wall opening 36 if desired.

Sensors 52, here three sensors 52*c*, 52*d* and 52*e* as provided in the present embodiment, take the form of a magnetic reed switch such as Hamlin Model 59141 Miniature Flange Mount switch having a stationary sensor portion 88*a* and sensor actuator 88*b*. Magnetic sensors draw less current and are less expensive as compared to other sensors such as optical sensors. Additionally, being hermetically sealed, they are impervious to the environment (e.g., outdoor weather) and even suitable for use in an explosive atmosphere (suitable for use with gas containing bottles). As with the previous embodiment, the sensors preferably work with the stops 34. The stationary sensor portion 88*a* is mounted on the chute wall 30, e.g., one of the side walls, on a flat bar 90 so as to align with the sensor actuator 88*b* mounted on pivotal hinge section 42 for movement therewith. Wires or cable 55 connect the sensor 52 to the controller or other devices as may be provided for operating an indicator 18, here a ticket dispensing device. It is seen that movement of the sensor actuator 88*b* away from the sensor portion 88*a* activates the switch to indicate the presence of the bottle at the location of the bottle stop associated with that sensor. It is appreciated that the magnetic reed switch of the present embodiment moves from an electrically open position when the sensor actuator 88*b* is next to the stationary sensor portion 88*a* to a closed position where the sensor actuator 88*b* is away from the stationary sensor portion 88*a*, and that other configurations are available with use of other type sensors, e.g., the electronics can be configured such that the magnetic reed switch is electrically opened when the sensor actuator 88*b* moves away from the stationary sensor portion 88*a*, the opening of the sensor circuit indicating that a bottle is sensed. Accordingly, for purposes of this description, regardless of the type of sensor used, each of the sensors are triggered or activated when the two sensor portions 88*a*, 88*b* of a sensor move apart due to the engagement of a bottle with the stop member associated with that particular sensor.

In a preferred configuration of the present embodiment, the first stop/sensor 34*c*, 52*c* is positioned on the top wall approximately 6 inches longitudinally (from inlet to outlet) from the outlet opening 28, the second stop/sensor 34*d*, 52*d* is positioned approximately 1⅞ inches longitudinally from the first stop/sensor 34*c*/52*c*, and the third stop/sensor 34*e*, 52*e* is positioned approximately 1⅞ inches longitudinally from the second stop/sensor. These dimensions are chosen in view of the configuration of the typical water bottle 12 which has peaks and recesses along the outer wall such as the handle area. The distance between such peaks and recesses is typically at last 2 inches such that the distance of 1⅞ inches allows at least two of the sensors 52 to be triggered at any given time.

There are numerous configurations that can be used with the sensors before dispensing a receipt such as a ticket. A presently preferred method controlled by a controller is described below. This configuration is based on the three sensors 52 (52*c*, 52*d*, and 52*e*) being separated from one another longitudinally moving from the inlet 26 to the outlet 28 as described above, e.g., the sensors are 1⅞ inches from one another, with the bottle 12 contacting the first sensor (52*c*), then second sensor (52*d*), and then third sensor (52*e*) as it moves through the chute 24 toward the outlet 28. As will be seen, as the bottle 12 reaches and engages a stop member, the sensor associated with that stop member is opened, triggering a signal to the controller indicating that the bottle is detected at that position.

The process is initiated by inserting a bottle 12 into the chute 24 through the inlet 26 and pushing it towards the chute outlet 28. The sequence of events as the bottle moves through the chute 24 that must occur before a receipt will be dispensed is as follows:

(a) The first sensor (here the top sensor 52c) being closest to chute inlet will detect the bottle first. It must be the only sensor initially triggered to indicate the presence of a bottle 12 in the chute 24. The first sensor must be triggered prior to the triggering of the second and/or third sensors or the system will reset, not continue to the next step, and not issue a receipt.

(b) Next, the second sensor 52d must detect the bottle 12 while the first sensor 52c remains in the triggered state, i.e., as the bottle continues to move from the inlet 26 to the outlet 28 after the first sensor 52c is triggered, the second sensor 52d is triggered so that both first and second sensors are now in the triggered state at the same time. This must occur prior to the third sensor 52e being triggered or the system will reset, not continue to the next step, and not issue a receipt.

(c) Next, the third sensor 52e must detect the bottle 12 while the second sensor 52d remains in the triggered state, i.e., as the bottle continues to move towards the outlet after the second sensor 52d is triggered, the third sensor 52 is triggered so that both second and third sensors are now in the triggered state at the same time. Whether or not the first sensor 52c is still triggered is not relevant.

(d) Next, all three sensors must no longer be in the triggered state, indicating that the bottle 12 has exited the chute 24.

(e) Next, once the above steps are satisfied, a receipt is dispensed and the system resets for the next bottle.

A timer starts with the initiation of each of the above events. If the next event is not triggered within a preset amount of time, the system resets. For example, the timer begins when the first sensor 52c is triggered in step a above. If the second sensor 52d is not triggered in step (b) above within this preset amount of time, the system will reset, not continue to the next step, and not issue a receipt. Where the device is powered by a battery, this will protect the battery from discharging by depowering the system in the event a bottle gets stuck or someone is trying to manipulate the sensors. A time period of about 6.5 seconds is presently preferred, after which the system goes to sleep to conserve power until the first sensor is again triggered in step (a).

Once a receipt is dispensed, a second timer period must pass before the system will reset for registering another bottle 12 passing through the chute 24. This protects the system from manipulation to obtain additional receipts. A time period of about 1.5 seconds is presently preferred.

It is appreciated that additional stops and/or sensors could be added, e.g., in the square chute embodiment, a stop and sensor could be positioned in the bottom wall; and in a cylindrical chute, many additional stops and or sensors spaced longitudinally from one another can be used.

Additional sensors beyond the chute can be added as desired. For example, and optical sensor could be added behind the outlet to sense the movement of a bottle after it has exited the chute to insure that a bottle has in fact been received by the apparatus.

In the illustrated embodiment the chute 24 is about 15 inches in length. In some embodiments it may be necessary to make the chute 24 shorter, such as where the cage 14 has a smaller depth, thereby requiring a shorter chute to allow the bottle to fall between the end of the chute and the back of the cage. For example, in one embodiment a chute length of 11 inches may be required where the depth of the cage is 33 inches. A cutout 92 in the bottom of the chute along the back edge (illustrated by dotted line 92 in FIG. 16) would allow the bottle 12 to begin moving downward before fully exiting the back end of the chute so as to fit between the chute and the cage wall. A semi-circular cut out in view of the circular shape of the bottle can be used, although any suitable shape for the cut out is possible.

It is appreciated that described above are novel apparatuses and methods. It is also understood that this invention is not limited to bottles, but can be used with any suitable item, although changes and modifications to the configuration of the device may be required for the particular item. It is also understood that the invention is not limited to the embodiments and illustrations described above, and includes the full scope provided by the claims appended hereto.

The invention claimed is:

1. An apparatus for receiving and detecting a bottle, comprising:
   a chute configured for receiving the bottle therein, said chute having an inlet for receiving the bottle and an outlet through which the bottle exits said chute;
   a first bottle stop having a moveable first stop member disposed within said chute and biased towards said bottle to allow said stop member to engage said bottle moving through said chute, said stop member configured such that said stop member is moved by said bottle in a direction away from said bottle as said bottle moves from said inlet to said outlet thereby allowing said bottle to pass, and said stop member is moved by said bottle in accordance with said bias in a direction towards said bottle as said bottle moves in a direction from said outlet to said inlet to more forcibly engage and thereby inhibit movement of said bottle;
   a second stop having a second stop member disposed to engage the bottle within said chute and inhibit movement of said bottle moving from said outlet to said inlet, said second stop member being disposed to engage said bottle along a different area of said bottle than said first stop member;
   an indicator for indicating the receipt of a bottle;
   a first sensor for detecting when the bottle is at a first position within said chute, said sensor being in communication with said indicator; and
   a second sensor for detecting when the bottle is at a second position within said chute spaced longitudinally from said first position between said first position and said outlet, said second sensor being in communication with said indicator.

2. The apparatus of claim 1 further comprising a third stop having a third stop member disposed to engage the bottle within said chute and inhibit movement of said bottle moving from said outlet to said inlet.

3. The apparatus of claim 2 wherein two of said first, second and third stop members are positioned to engage substantially opposite sides of said bottle within said chute thereby cooperating with one another to inhibit movement of said bottle in the direction from said outlet towards said inlet.

4. The apparatus of claim 1 comprising a third sensor for detecting when the bottle is at a third position within said chute spaced longitudinally from said second position between said second position and said outlet, said third sensor being in communication with said indicator.

5. The apparatus of claim 1 wherein said stop member is pivotally moveable relative to said chute wall and extending towards an internal portion of said chute in which said bottle moves, said stop member configured to move towards said outlet and said chute wall when said bottle engages said stop member moving in the direction from said inlet towards said outlet, and said stop member configured to move away from said chute wall and away from said outlet when said bottle engages said stop moving in the direction from said outlet towards said inlet.

6. The apparatus of claim 1 wherein said indicator comprises a ticket dispenser.

7. The apparatus of claim 4 wherein said indicator comprises a ticket dispenser.

8. The apparatus of claim 1 wherein said first sensor comprises a magnetic sensor having a first section fixed to said chute and a second section moveable from a position adjacent to said first section to a position removed from said first section for indicating detection of the bottle.

9. The apparatus of claim 8 wherein said second section of said magnetic sensor is connected to said first stop member for movement therewith.

10. The apparatus of claim 1 wherein said chute includes a cutout positioned in the bottom of said chute along said outlet which is configured to allow the bottle to exit said chute in a shorter longitudinal length than without said cutout.

11. The apparatus of claim 4 wherein said chute is rectangular having four sides, and said first, second and third sensors are located on different said sides from one another.

12. A method of receiving and detecting a bottle, comprising:
(a) providing a chute having an inlet through which the bottle is received and an outlet through which the bottle exits, said chute extending longitudinally from said inlet to said outlet;
(b) detecting the bottle at various positions in said chute as follows:
(b)(1) detecting the bottle at a first position within said chute via a sensor in communication with an indicator;
(b)(2) upon satisfaction of (b)(1), detecting the bottle at a second position within said chute via a second sensor in communication with said indicator, said second position being spaced longitudinally from said first position between said first position and said outlet; and
(c) upon satisfaction of step (b), said indicator causing a receipt to be dispensed.

13. A method in accordance with claim 12 wherein step (b) further includes the step of:
(b)(3) upon satisfaction of (b)(2), detecting the bottle at a third position within said chute via a third sensor in communication with said indicator, said third position being spaced longitudinally from said second position between said second position and said outlet.

14. A method in accordance with claim 12 wherein step (b)(2) comprises detecting the bottle at said second position within said chute while also detecting the bottle at said first position within said chute.

15. A method in accordance with claim 13 wherein step (b)(2) comprises detecting the bottle at said second position within said chute while also detecting the bottle at said first position within said chute.

16. A method in accordance with claim 15 wherein step (b)(3) comprises detecting the bottle at a third position within said chute while also detecting the bottle at said second position within said chute.

17. An apparatus for receiving and detecting a bottle, comprising:

a chute configured for receiving the bottle therein, said chute having a bottle inlet for receiving the bottle and a bottle outlet through which the bottle exits said chute;
a first sensor disposed to detect the bottle at a first position within said chute;
a second sensor disposed to detect the bottle at a second position within said chute, the second position being spaced longitudinally from said first position between said first position and said outlet;
a third sensor disposed to detect the bottle at a third position within said chute, the third position being spaced longitudinally from said second position between said second position and said outlet; and
a receipt dispenser in data communication with said first, second and third sensors for issuing a receipt based on the data received.

18. The apparatus of claim 17 wherein said chute is rectangular, and each of said first, second and third sensors are positioned on different sides of said rectangular chute from the other of said first, second and third sensors.

19. The apparatus of claim 17 further comprising at least one bottle stop having a stop member disposed within said chute and biased away from a chute wall and towards said bottle so as to slidably engage said bottle moving through said chute in a direction from said inlet towards said outlet, said stop member being moveably mounted so as to be moveable against said bias in a direction away from said bottle towards said chute wall when said bottle engages said stop member as said bottle moves from said inlet to said outlet while being moveable in a direction in accordance with said bias away from said chute wall into said bottle as said bottle engages said stop member as said bottle moves in a direction from said outlet to said inlet to more forcibly engage and thereby inhibit movement of said bottle.

20. The apparatus of claim 17 wherein at least one of said first, second and third sensors comprises a magnetic sensor having a first section fixed to said chute and a second section moveable from a position adjacent said first section to a position removed from said first section to indicate detection of the bottle.

21. A method of receiving and detecting a bottle, comprising:
(a) providing a chute having an inlet through which the bottle is received and an outlet through which the bottle exits, said chute extending longitudinally from said inlet to said outlet;
(b) detecting the bottle at various positions in said chute as follows:
(b)(1) detecting the bottle at a first position within said chute;
(b)(2) detecting the bottle at a second position within said chute, said second position being spaced longitudinally between said inlet and said outlet further from said inlet than said first position; and
(c) upon detection of the bottle at the various positions of step (b), providing an indication that a bottle has been received.

22. A method in accordance with claim 21 wherein step (b) further includes the step of:
(b)(3) detecting the bottle at a third position within said chute, said third position being spaced longitudinally between said inlet and said outlet further from said inlet than said first and second positions.

* * * * *